United States Patent
Line et al.

(10) Patent No.: US 12,139,052 B2
(45) Date of Patent: Nov. 12, 2024

(54) SEATING SOLUTIONS FOR A STATIONARY VEHICLE

(71) Applicant: Ford Global Technologies, LLC, Dearborn, MI (US)

(72) Inventors: Johnathan Andrew Line, Northville, MI (US); Robert Allen Bastuba, Jr., Macomb, MI (US); Collin Joshua Smith, Royal Oak, MI (US); Robert Charles Shipley, Westland, MI (US); Francisco Edgar Guizar, Mexico City (MX); Scott Culver Anderson, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 353 days.

(21) Appl. No.: 17/700,057

(22) Filed: Mar. 21, 2022

(65) Prior Publication Data
US 2023/0294571 A1    Sep. 21, 2023

(51) Int. Cl.
*B60N 2/20* (2006.01)
*B60N 2/30* (2006.01)

(52) U.S. Cl.
CPC ............ *B60N 2/203* (2013.01); *B60N 2/3011* (2013.01); *B60N 2/3047* (2013.01); *B60N 2/3097* (2013.01); *B60N 2205/30* (2013.01)

(58) Field of Classification Search
None
See application file for complete search history.

(56) References Cited

U.S. PATENT DOCUMENTS

| | | | |
|---|---|---|---|
| 4,541,654 A | * | 9/1985 | Jonasson .............. B60N 2/2863 297/483 |
| 4,679,810 A | | 7/1987 | Fry et al. |

(Continued)

FOREIGN PATENT DOCUMENTS

| | | | | |
|---|---|---|---|---|
| DE | 19741370 C1 | * | 7/1998 | .............. B60N 2/20 |
| EP | 3808596 A1 | * | 4/2021 | .............. B60N 2/22 |
| KR | 20160143027 | * | 1/2016 | |

OTHER PUBLICATIONS

U.S. Appl. No. 17/700,018, filed Mar. 21, 2022, Docketed New Case—Ready for Examination, Seating Solutions for a Stationary Vehicle.

(Continued)

*Primary Examiner* — Joseph D. Pape
(74) *Attorney, Agent, or Firm* — Vichit Chea; Price Heneveld LLP

(57) ABSTRACT

A seating assembly for a vehicle includes a backrest extending between a first surface and a second surface. The second surface opposes the first surface. A first seat base operably couples with the backrest to form a first seat of the seating assembly. The backrest is pivotable between a first use position and a second use position. A second seat base is operably coupled via a connection interface with the backrest. The second seat base and the backrest form a second seat of the seating assembly in the second use position. The second seat faces away from the first seat in the second use position. A cross-sectional plane intersecting each of the first surface and the second surface defines a cross-sectional area of the backrest that remains constant between the first use position and the second use position of the backrest.

20 Claims, 13 Drawing Sheets

(56) References Cited

U.S. PATENT DOCUMENTS

| | | | |
|---|---|---|---|
| 5,078,443 | A | 1/1992 | Austin |
| 6,672,662 | B1 | 1/2004 | Balk |
| 6,991,285 | B1 | 1/2006 | Hemenway |
| 7,195,302 | B2 | 3/2007 | Jovicevic |
| 7,708,331 | B2 | 5/2010 | Yamasaki |
| 9,199,553 | B2 | 12/2015 | Cuddihy et al. |
| 9,340,126 | B2 | 5/2016 | Cuddihy et al. |
| 10,081,272 | B2 | 9/2018 | De Saulles |
| 11,021,084 | B2 | 6/2021 | Sakurai |
| 11,738,670 | B2 * | 8/2023 | Lee .................... B60N 2/01516 296/65.01 |
| 2008/0203805 | A1 | 8/2008 | Hansen |
| 2009/0195037 | A1 | 8/2009 | Plavetich et al. |
| 2015/0168016 | A1 * | 6/2015 | Benz ........................ F24S 10/00 126/652 |
| 2020/0290484 | A1 | 9/2020 | Line et al. |
| 2020/0376986 | A1 | 12/2020 | Line et al. |
| 2021/0229572 | A1 | 7/2021 | Line et al. |

OTHER PUBLICATIONS

U.S. Appl. No. 17/699,952, filed Mar. 21, 2022, Docketed New Case—Ready for Examination, Seat-Mounted Work Surface.

U.S. Appl. No. 17/700,081, filed Mar. 21, 2022, Docketed New Case—Ready for Examination, Seating Solutions for a Stationary Vehicle.

U.S. Appl. No. 17/699,981, filed Mar. 21, 2022, Docketed New Case—Ready for Examination, Seating Solutions for a Vehicle.

U.S. Appl. No. 17/699,755, filed Mar. 21, 2022, Docketed New Case—Ready for Examination, Vehicle Seating System for a Stationary Vehicle.

U.S. Appl. No. 17/699,781, filed Mar. 21, 2022, Docketed New Case—Ready for Examination, Vehicle Seating System for a Stationary Vehicle.

U.S. Appl. No. 17/699,996, filed Mar. 21, 2022, Docketed New Case—Ready for Examination, Seating Assembly with Swivel Capability.

U.S. Appl. No. 17/700,007, filed Mar. 21, 2022, Docketed New Case—Ready for Examination, Vehicle Floor Panel.

* cited by examiner

SEATING SOLUTIONS FOR A STATIONARY VEHICLE

FIELD OF THE DISCLOSURE

The present disclosure generally relates to a vehicle. More specifically, the present disclosure relates to seating solutions for a stationary vehicle.

BACKGROUND OF THE DISCLOSURE

Vehicles are often provided with one or more seating solutions. Seating solutions provided within a passenger compartment of a stationary vehicle may be a deciding factor in a consumer purchase decision.

SUMMARY OF THE DISCLOSURE

According to a first aspect of the present disclosure, a seating assembly for a vehicle includes a backrest extends between a first surface and a second surface. The second surface opposes the first surface. A first seat base operably couples with the backrest to form a first seat of the seating assembly. The backrest is pivotable relative to the first seat base between a first use position and a second use position. A second seat base has an attached configuration. In the attached configuration, the second seat base is operably coupled via a connection interface with the backrest, the second seat base and the backrest form a second seat of the seating assembly in the second use position, and the second seat faces away from the first seat in the second use position. A cross-sectional plane intersecting each of the first surface and the second surface defines a cross-sectional area of the backrest. The cross-sectional area remains constant between the first use position and the second use position of the backrest.

Embodiments of the first aspect of the disclosure can include any one or a combination of the following features:
- the second surface is operable to support an upper body portion of an occupant when the backrest is in the second use position, and wherein the first surface is operable to support the upper body portion of the occupant when the backrest is in the first use position;
- the first use position is defined by the backrest extending at a recline angle between the backrest and the first seat in the range of approximately 90 degrees to approximately 140 degrees, and wherein the second use position is defined by the recline angle being in the range of approximately 40 degrees to approximately 110 degrees;
- the cross-sectional area corresponds to a width of the backrest;
- each plane intersecting the first and second surfaces defines an area remaining constant between the first use position and the second use position;
- a rest member disposed adjacent a top surface of the backrest and extending between a front surface corresponding with the first surface of the backrest and a rear surface corresponding with the second surface of the backrest;
- the rear surface is substantially aligned with the second surface;
- the seating assembly includes a frame structure supporting the seating assembly, wherein the frame structure forms at least a part of the connection interface;
- the second seat base has a detached configuration, wherein the second seat base is decoupled from the backrest in the detached configuration;
- the connection interface includes a receiving member and an engaging member, the frame structure defining the receiving member and the engaging member extending from the second seat base for engaging the receiving member to support the second seat base in the attached configuration;
- the seating assembly includes at least one leg extending from a distal end of the second seat base toward a floor of the vehicle in the attached configuration;
- the seating assembly includes at least one hook extending outwardly from a proximal end of the second seat base;
- the frame structure includes a bar extending along a width of the seating assembly, the at least one hook engaging the bar to form the connection interface in the attached configuration;
- the attached configuration, the second seat base is pivotable between a stowed position and a deployed position, and wherein the second seat base engages the second surface in the stowed position, and a distal end of the seat base, opposite the proximal end, is spaced from the second surface in the deployed position; and
- the seating assembly includes a support arm extending between the backrest and the second seat base for supporting the second seat base in the deployed position.

According to a second aspect of the present disclosure, a seating assembly for a vehicle includes a first seat facing a first direction. A second seat faces a second direction opposite the first direction. A backrest common to the first and second seats has a first surface corresponding to the first seat and a second surface corresponding to the second seat. The second seat includes a seat base pivotally engaging the backrest and rotatable between a stowed position and a deployed position. The seat base includes a seating surface supporting a lower body portion of an occupant in the deployed position. The second surface is operable to support an upper body portion of the occupant in the deployed position and contacts the seating surface in the stowed position. The first surface is fixed relative to the second surface between a rotational movement of the backrest.

Embodiments of the second aspect of the present disclosure can include any one or a combination of the following features:
- the seating assembly includes a frame structure having an upper portion supporting the backrest, a lower portion supporting a lower body support of the first seat, and an intermediate portion interconnecting the upper portion and the lower portion, wherein the intermediate portion defines a pair of receiving members extending into the frame structure;
- the seating assembly includes a pair of engaging members extending from the seat base for releasably engaging the pair of receiving members;
- the seating assembly includes at least one leg extending between a distal end of the seat base and a floor of the vehicle in the deployed position to support the seat base;
- the seating assembly includes a frame structure supporting the seating assembly and including a bar extending along a width of the seating assembly;
- the seating assembly includes at least one hook extending outwardly from a proximal end of the seat base and engaging the bar, wherein the at least one hook is rotatable about the bar between the deployed position and the stowed position; and the seating assembly includes a support arm extending between the backrest and the seat base for supporting the seat base in the deployed position.

According to a third aspect of the present disclosure, a vehicle includes a first seat facing a first direction and a second seat facing a second direction. Each of the first seat and the second seat includes a lower body support for supporting a lower body portion of an occupant. Each of the first seat and the second seat includes an upper body support for supporting an upper body portion of the occupant. An upper support member forming the upper body support of the first seat and the second seat and has a thickness extending between each upper body support. The upper support member is pivotable relative to the lower body support of the first seat between a forward position and a reclined position. The lower body support of the second seat is selectively coupled with the upper support member. The thickness of the upper support member remains constant between the forward position and the reclined position of the upper support member.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
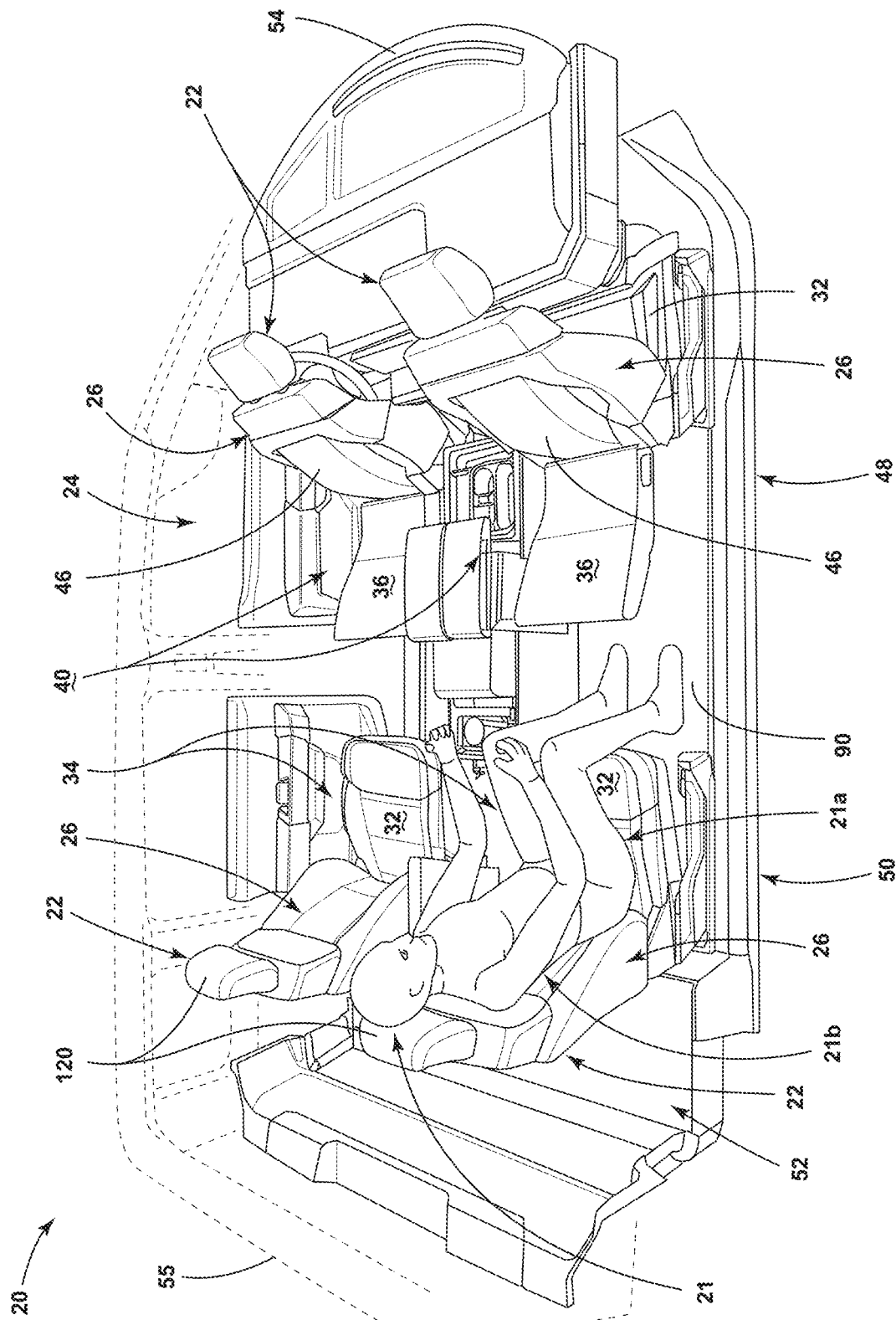
FIG. 1 is a side perspective view of a passenger compartment of a vehicle, illustrating seating assemblies, according to one exemplary arrangement when the vehicle is in a stationary non-moving state.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to seating solutions for a stationary vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-13C, reference numeral 20 generally designates a vehicle. The vehicle 20 may be a motor vehicle. While the vehicle 20 may be a motor vehicle, the present disclosure is not limited to internal combustion engines as a source of locomotive power for the vehicle 20. Rather, alternative sources may be utilized in providing locomotive power to the vehicle 20. For example, locomotive power may be provided to the vehicle 20 by electric motors, fuel cells, and/or petroleum-based fuel engines. According to various examples, the vehicle 20 may be driver-controlled, semi-autonomous, fully-autonomous, or any combination of user-controlled and automated. For example, the semi-autonomous example of the vehicle 20 may perform many, or all, commuting functions (e.g., accelerating, breaking, turning, signaling, etc.) independent of interaction while a user 21 maintains override control of the vehicle 20.

The vehicle 20 includes at least one seating assembly 22 disposed in a passenger compartment 24 of the vehicle 20. According to some aspects of the disclosure, the seating assembly 22 for the vehicle 20 includes a backrest 26 extending between a first surface 28 and a second surface 30, which may be opposite, may face away from, or may oppose the first surface 28. A first seat base 32 operably couples with the backrest 26 to form a first seat 34 of the seating assembly 22. The backrest 26 is pivotable relative to the first seat base 32 between a first use position and a second use position. The seating assembly 22 includes a second seat base 36 that may have an attached configuration and a detached configuration. In the attached configuration, the second seat base 36 is operably coupled via a connection interface with the backrest 26. The second seat base 36 and the backrest 26 form a second seat 40 of the seating assembly 22 in the second use position. The first surface 28 may correspond to the first seat 34, and the second surface 30 may correspond to the second seat 40. The second seat 40 can face away from the first seat 34 in the use position. A cross-sectional plane that intersects each of the first surface 28 and the second surface 30 defines a cross-sectional area of the backrest 26. The cross-sectional area may remain constant between the first use position and the second use position of the backrest 26. In some examples, the first seat 34 faces a first direction and the second seat 40 faces a second direction opposite the first direction. The first surface 28 may be fixed relative to the second surface 30 between a rotational movement of the backrest 26.

Figure 2:
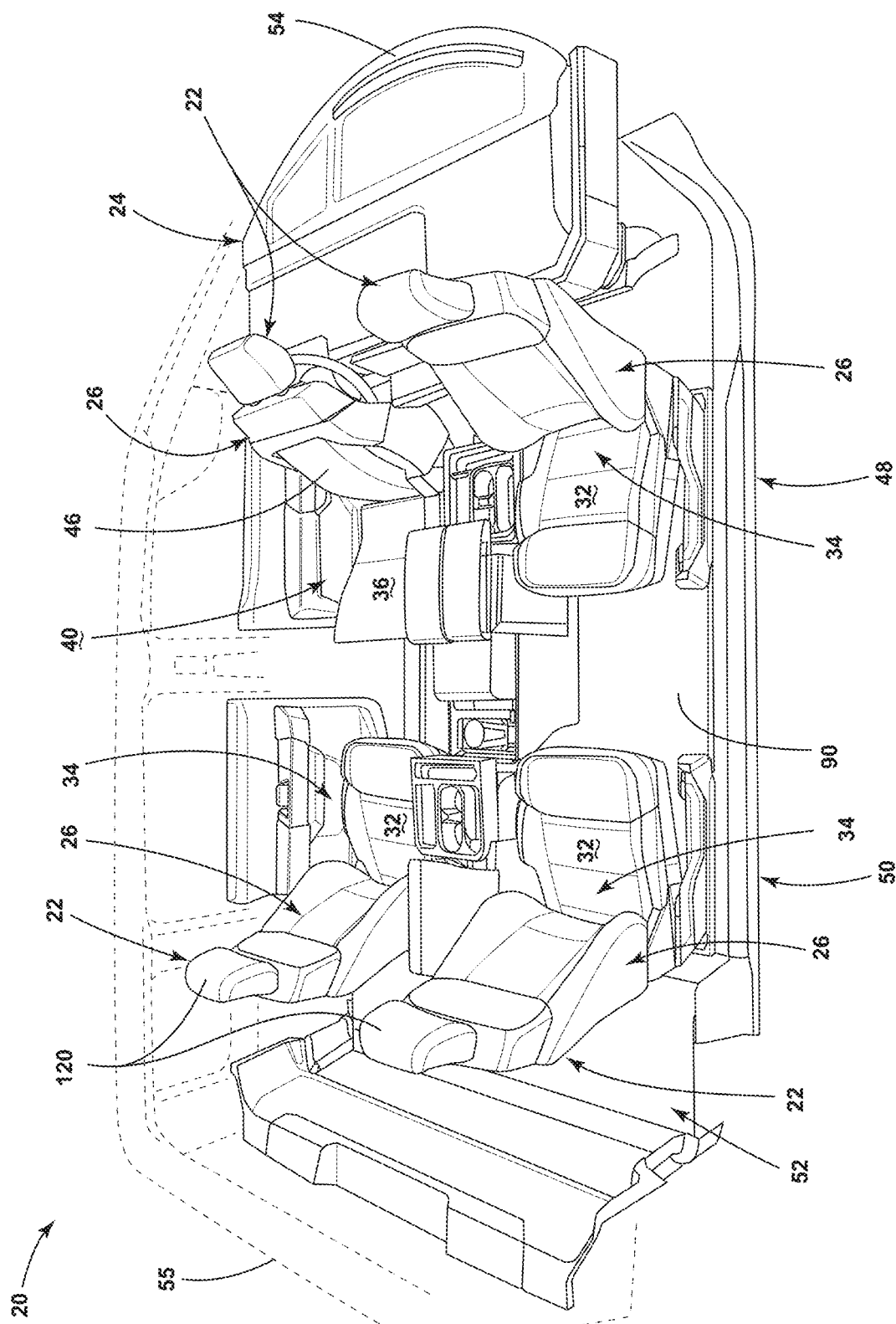
FIG. 2 is a side perspective view of a passenger compartment of a vehicle, illustrating seating assemblies, according to one exemplary arrangement when the vehicle is in a stationary non-moving state.

The seating arrangements depicted in FIGS. 1 and 2 may be referred to as social arrangements, conferencing arrangements, and/or remote office arrangements. These social arrangements, conferencing arrangements, and/or remote office arrangements are intended for use when the vehicle 20 is in a stationary non-moving state (e.g., when the vehicle 20 is parked).

It is contemplated that the second use position may be only accessible when the vehicle 20 is stationary, in a parked gear, deactivated (e.g., an engine of the vehicle 20 not running or the ignition not engaged), etc. Further, electrical or mechanical lockouts may be provided to limit the seating assembly 22 from entering the second use position. Moreover, seat position sensors may be provided to detect weight applied to the second seat 40 to determine the presence of an occupant in the second seat 40 outside of authorized positions.

According to some aspects of the disclosure, the second seat base 36 selectively couples to the first seat 34 via an engaging member extending from a proximal end 42 of the second seat base 36. In the detached configuration, the second seat base 36 is decoupled from the first seat 34. The backrest 26 may be common to the first and second seats 34, 40 in the attached configuration. The seating assembly 22 includes a frame structure 44 that can operably couple the first seat 34 with the vehicle 20. The frame structure 44 may include a receiving member adjacent the second surface 30 for interfacing with the second seat base 36. The engaging member may engage the receiving member to couple the second seat base 36 with the backrest 26. It is contemplated that the detached configuration of the second seat base 36 may be dependent on the vehicle 20 being stationary or in a state previously described with respect to a parked or off state of the vehicle 20.

According to some aspects of the disclosure, the second seat base 36 pivotally couples with a seat back 46 of the second seat 40. The second seat base 36 may be moveable between a stowed position in which the second seat base 36 engages the seat back 46, and a deployed position in which the second seat base 36 is folded outwardly from the seat back 46. A locking feature may extend between the second seat base 36 and the seat back 46. The locking feature may be moveable between a locked position and an unlocked position. The locking feature engages the second seat base 36 in the locked position to maintain the second seat base 36 in the stowed position. The locking feature is disengaged from the second seat base 36 in the unlocked position to allow the second seat base 36 to move toward the deployed position. The connection interface may also or alternatively be between the backrest 26 and the seat back 46. The engaging member may selectively engage the receiving member to secure the second seat 40 to the first seat 34 in an attached configuration of the second seat 40.

It is generally contemplated that all or some of the second seat 40 may be coupled with other structures, such as a wall of a vehicle 20, building, or the like, in the detached configuration. While modern OEMs of passenger vehicles currently warn occupants against sitting in the bed of a pickup truck while the vehicle 20 is moving due to safety concerns, it is anticipated that technology and the regulatory framework may evolve in the future to where such an activity is safe and permissible. It is contemplated that detachment or unlocking may be allowed when the vehicle 20 is parked or stationary, and the second seat 40 may be allowed to coupled to a structure or operate as a standalone seat (e.g., as a stadium seat, a bag chair, a table, etc.).

It is generally contemplated that the first seat 34 may be referred to as a primary seat and the second seat 40 may be referred to as an auxiliary seat. Similarly, the first seat base 32 may be referred to as a primary seat base 32 and the second seat base 36 may be referred to as an auxiliary seat base. The term "backrest" may refer to a primary seat back and, in some arrangements, serve as the seat back 46. In still other examples, the seat back 46 may be referred to as an auxiliary seat back. In general, the disclosure provides for a primary seat 34 that is mounted in the cabin of the vehicle 20, and an auxiliary seat 40 that is selectively coupled with the primary seat 34. The primary and auxiliary seat bases 32, 36 may be referred to as lower body supports, and the primary and auxiliary seat backs 26, 46 may be referred to as upper body supports. As previously described, the selective detachment or deployment of the auxiliary seat 40 or auxiliary seat base 36 may be only allowed when the vehicle 20 is stationary, in a parked gear, deactivated (e.g., an engine of the vehicle 20 not running or the ignition not engaged), etc. Further, electrical or mechanical lockouts may be provided to limit the auxiliary seat 40 from detaching or decoupling from the primary seat 34.

Referring now to FIGS. 1 and 2, the vehicle 20 can include a first row of seating assemblies 48, a second row of seating assemblies 50, and/or a third row of seating assemblies 52. The first row of seating assemblies 48 may be positioned nearest a front 54 of the vehicle 20 and/or the passenger compartment 24. The third row of seating assemblies 52 may be positioned nearest to a rear 55 of the vehicle 20 and/or the passenger compartment 24. The second row of seating assemblies 50 may be positioned at an intermediate location between the first and second rows of seating assemblies 48, 50. As previously described, each seating assembly 22 can include the primary seat base 32 and the backrest 26 that together form the primary seat 34. In cases where the seating assembly 22 incorporates the auxiliary seat 40 into or onto the backrest 26, the backrest 26 may serve as the seat back for the primary seat 34 and the auxiliary seat 40. The primary seat base 32 and the backrest 26 of the each seating assembly 22 may be coupled to one another (e.g., by an intermediate structure, such as a frame structure 44) such that the backrest 26 is pivotable relative to the primary seat base 32 and the primary seat base 32 is pivotable relative to the backrest 26 (see FIG. 2). The primary seat base 32 is configured to support a lower body portion 21a of a user 21, such as the upper legs, lower back, and the like when the user 21 is seated in the seating assembly 22. The backrest 26 is configured to support an upper body portion 21b of the occupant, or user 21, such as a back, shoulders, and the like.

Referring again to FIGS. 1 and 2, in various examples, one or more of the seating assemblies 22 may be provided with the ability to swivel or rotate about a vertical axis, where the vertical axis extends through the primary seat base 32. Accordingly, such an example of the seating assembly 22 may be capable of being oriented in a forward-facing position and/or a rearward-facing position (see FIG. 2). While the swivel functionality allows for different seating orientations, modern OEMs of passenger vehicles would currently warn against employing some alternative uses for the passenger compartment 24 while the vehicle 20 is in motion; however it is anticipated that technology and the regulatory framework may evolve in the future to where such an activity is safe and permissible.

In some examples, one or more of the seating assemblies 22 may be provided with the auxiliary seat 40 coupled to a rearward surface of the backrest 26 thereof, such as the second surface 30. In such examples, the auxiliary seat back 46 may be carried by the rearward surface of the backrest 26. The auxiliary seat back 46 may be provided with a cushion portion that can enhance comfort of the user 21 when seated in the auxiliary seat 40. The auxiliary seat base 36 can be coupled to the rear side of the backrest 26 and be movable between the stowed position and the deployed position. For example, the auxiliary seat 40 may be pivotably coupled to a lower region of the rear side of the backrest 26. In such an example, pivotable motion of the auxiliary seat 40 in an upward direction from the deployed position can accomplish the stowed position, whereby the auxiliary seat base 36 is placed in an abutting relationship with the rear side of the backrest 26 and/or the auxiliary seat back 46.

Referring now to FIGS. 3-6, the auxiliary seat 40 may pivotally engage the backrest 26 via the connection interface. In particular, the connection interface may include the engaging member disposed on the auxiliary seat base 36 and the receiving member disposed on the backrest 26. The engaging member, which may be one or more hooks 56 as illustrated, engages the receiving member, which may be a bar 58. The at least one hook 56 may extend outwardly from the proximal end 42 of the auxiliary seat base 36 and engage the bar 58, with the at least one hook 56 being rotatable about the bar 58 between the deployed position and the stowed position. The at least one hook 56 may face away from the primary seat 34 and join with the bar 58 to pivotally connect the auxiliary seat base 36 with the primary seat 34. As shown, the bar 58 extends from the frame structure 44 of the seating assembly 22 (see FIG. 4) and allows selective engagement of the hooks 56 with the bar 58. For example, each hook 56 may include a clasping feature 60 operably coupled with a releasing mechanism 62 that the user 21 may interact with to allow attachment and/or detachment of the hooks 56 with the bar 58. When attached, the hooks 56 may be rotatable about the bar 58 between the stowed position in the deployed position. To detach the auxiliary seat base 36 from the backrest 26, the release mechanism may be pushed and/or manipulated to release the clasping feature 60, thereby allowing the auxiliary seat base 36 to be lifted from the bar 58. In this way, the auxiliary seat base 36 may be selectively attachable with the seating assembly 22. It is contemplated that, in other configurations, the bar 58 and the hooks 56 are in exchanged positions. For example, the engaging member may have the bar 58 extending outwardly from the proximal end 42 of the auxiliary seat base 36, and the receiving member may include the at least one hook 56.

Figure 3:
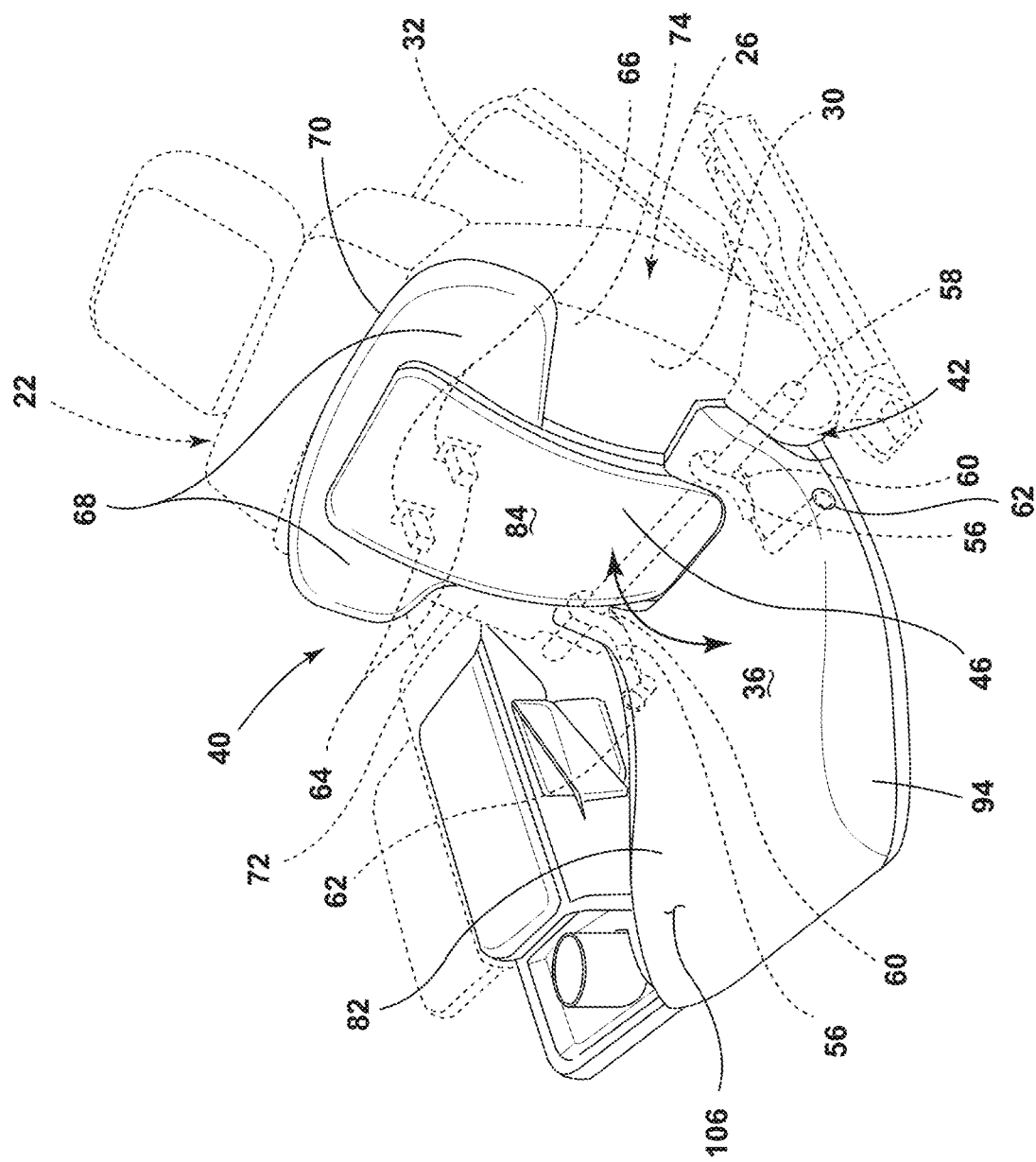
FIG. 3 is a rear perspective view of a primary seat equipped with an auxiliary seat, illustrating the auxiliary seat in a deployed position, according to one example.
Figure 5:
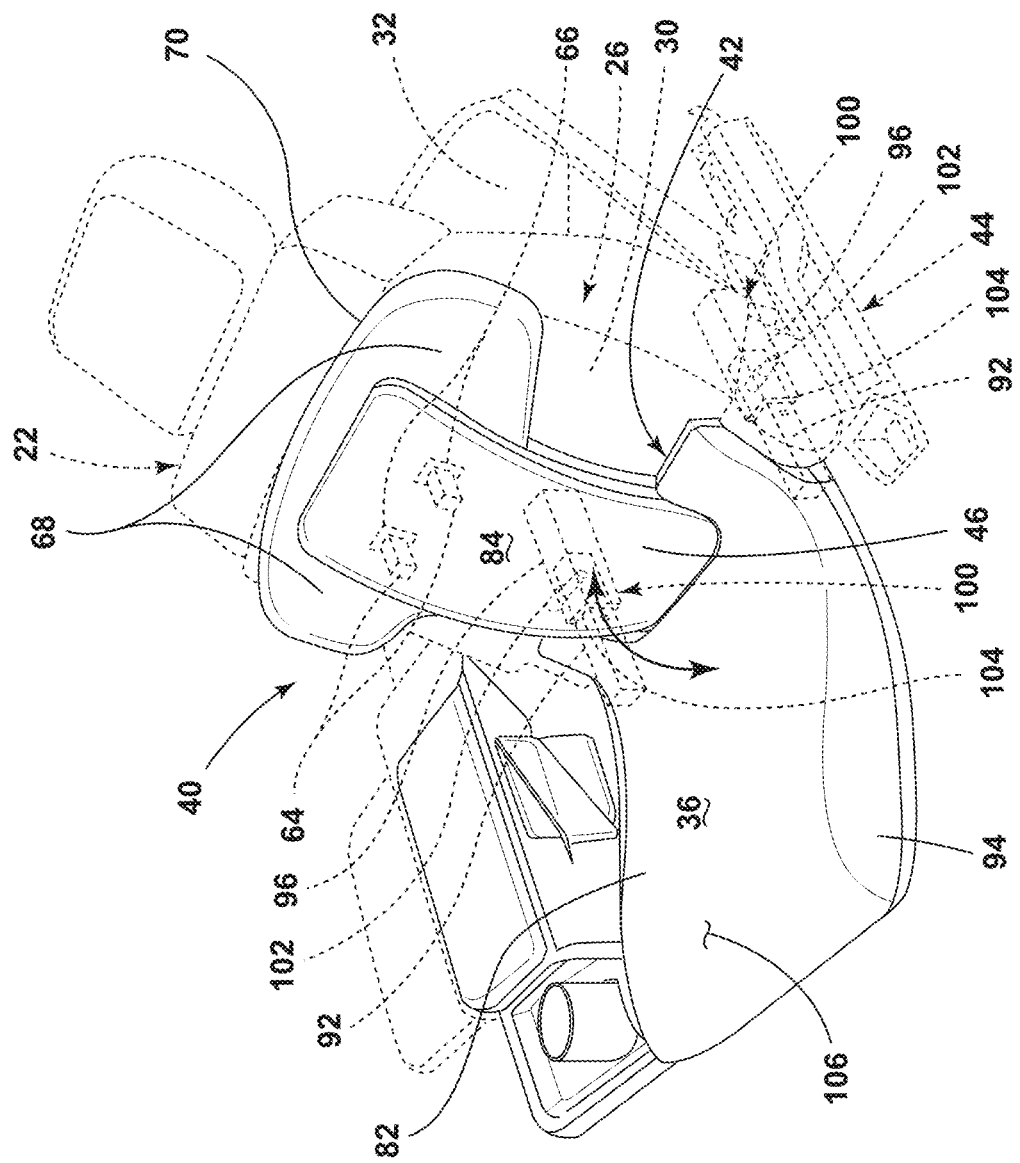
FIG. 5 is a rear perspective view of a primary seat equipped with an auxiliary seat, illustrating the auxiliary seat in a deployed position, according to one example.

This auxiliary seat back 46 may also be removably attached with the backrest 26 or, as discussed further herein, may be integrated with the backrest 26. In the detachable arrangement, the auxiliary seat back 46 may include male members 64, such as pegs, that engage female members 66, such as slots, formed on the backrest 26. The pegs may engage the slots to secure the auxiliary seat back 46 with the backrest 26. In particular, the pegs may engage the slots to attach the auxiliary seat back 46 with the second surface 30 of the backrest 26. It is generally contemplated that the pegs and the slots may be part of the connection interface between the primary seat 34 and the auxiliary seat 40. For example, when the entire auxiliary seat 40 is removable from the backrest 26, the pegs and the slots, in combination with the engagement members and the receiving members, allow the auxiliary seat back 46 and the auxiliary seat base 36 to be removed together from the backrest 26, respectively. Referring to FIGS. 3 and 5, the auxiliary seat 40 can include side bolsters 68 that are coupled to the auxiliary seat back 46. The side bolsters 68 may extend from an upper edge 70 of the auxiliary seat back 46 downwardly along at least a portion of right and left sides 72, 74 of the auxiliary seat back 46. It is generally contemplated that, although the auxiliary seat 40 is generally shown with padding along the auxiliary seat back 46 and along the auxiliary seat base 36, in some configurations, the padding may be less prevalent. For example, the auxiliary seat base 36 may have a flat rectangular shaped pad, as will be illustrated in further figures, and the auxiliary seat back 46 may be disposed within an indentation defined on the backrest 26. In various examples, the auxiliary seat back 46 may have a flat profile such that the auxiliary seat back 46 is continuous with the second surface 30 of the backrest 26 when in the attached configuration.

As previously described, the selective detachment or deployment of the auxiliary seat 40 or auxiliary seat base 36 may be only allowed when the vehicle 20 is stationary, in a parked gear, deactivated (e.g., an engine of the vehicle 20 not running or the ignition not engaged), etc. Further, electrical or mechanical lockouts may be provided to limit the auxiliary seat 40 from detaching or decoupling from the primary seat 34. Similar restrictions may also apply to the auxiliary seat back 46, such that the auxiliary seat back 46 may not be removable from the primary seat 34 unless the vehicle 20 is in a non-moving state.

Figure 4:
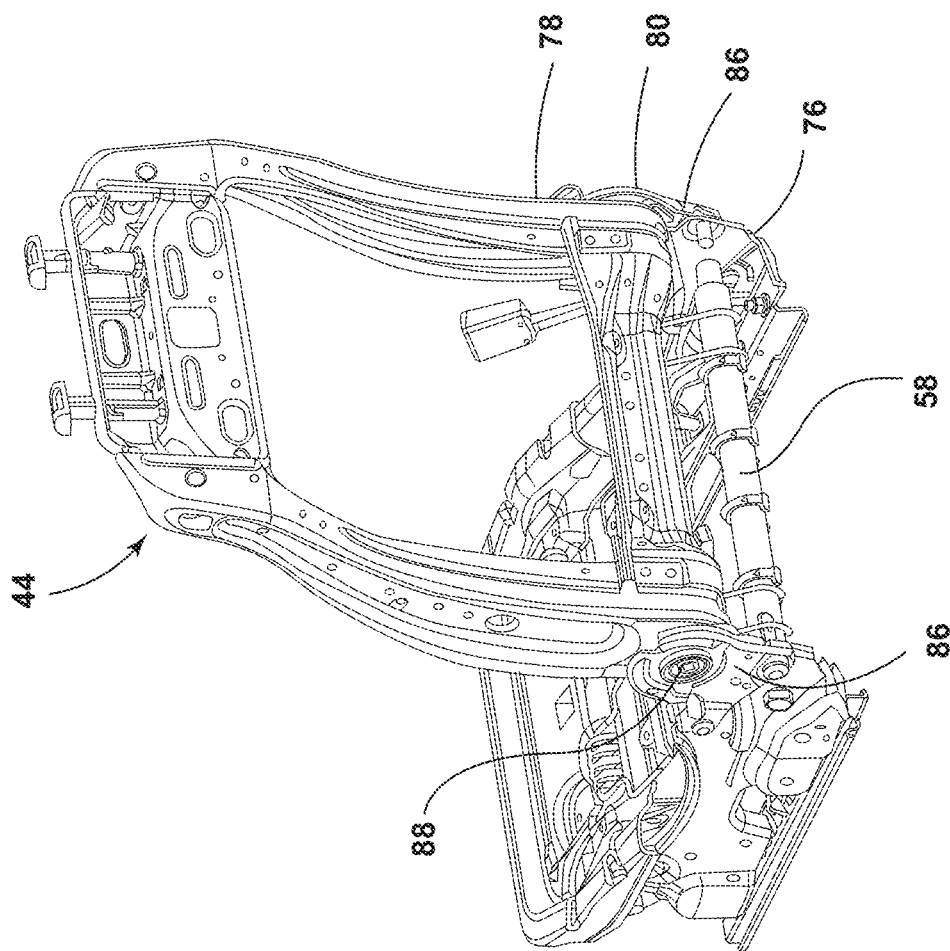
FIG. 4 is a rear perspective view of a seating assembly, illustrating structural components thereof, according to one example.

Referring now to FIG. 4, the seating assembly 22 is illustrated with padding omitted for clarity to show the frame structure 44. The frame structure 44 may include a lower portion 76, an upper portion 78, and an intermediate portion 80 interconnecting the upper portion 78 and the lower portion 76. The lower portion 76 may be configured to support a lower cushion arrangement 82 on the primary seat base 32. The upper portion 78 may support a backrest cushion arrangement 84 that may extend between the first surface 28 and the second surface 30 of the backrest 26. As illustrated, the receiving member (e.g., the bar 58) extends along a central axis and between two parts 86 of the intermediate portion 80 along a width of the seating assembly 22.

Although illustrated as an elongated bar 58, it is generally contemplated that the receiving member may include a protrusion extending from each part 86 toward one another and spaced from one another. Stated differently, in some configurations, the bar 58 does not fully extend between each part 86. The intermediate portion 80 and the upper portion 78 may interconnect at a junction 88 that defines an axis of rotation of the upper portion 78 of the frame structure 44 relative to the lower portion 76 of the frame structure 44. In this way, the backrest 26 may be pivotable relative to the primary seat base 32. The central axis and the axis of rotation may be spaced from another, with the central axis disposed between a floor 90 of the vehicle 20 and the axis of rotation. The frame structure 44 may support the seating assembly 22. The frame structure 44 may also form at least a part of the connection interface. The frame structure 44 operably couples the primary seat back (e.g., the backrest 26) and the primary seat base 32 to the floor 90 of the vehicle 20 and supports the primary seat 34. The frame structure 44 may define the receiving member that interacts with the secondary seat base 36.

Figure 6:
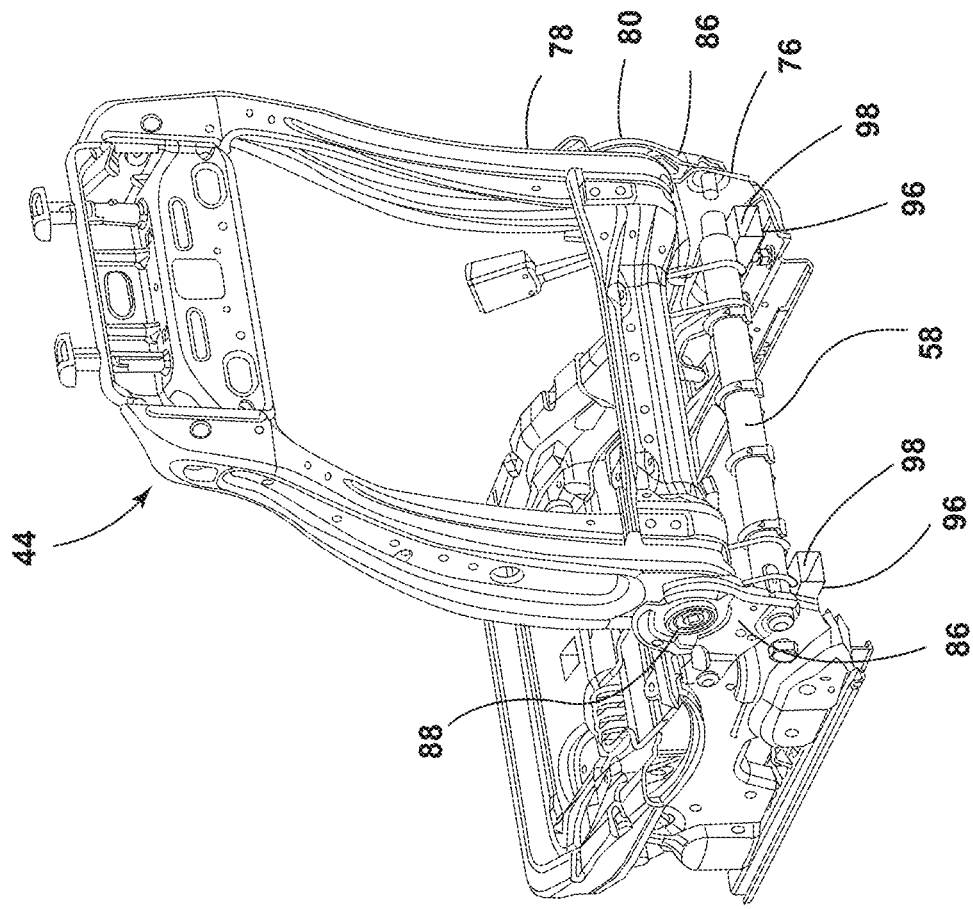
FIG. 6 is a rear perspective view of the seating assembly, illustrating structural components thereof, according to one example.

Referring now to FIGS. 5 and 6, the engagement member may include a pair of tubes 92 that project from the proximal end 42 of the auxiliary seat base 36 along or aligned with/parallel with sides 94 of the auxiliary seat base 36. The frame structure 44 may define a pair of sleeves 96 that are operable to receive the pair of tubes 92, such that the pair of tubes 92 may releasably engage the pair of tubes 92. The pair of sleeves 96 can extend into the frame structure 44 parallel to the sides of the seating assembly 22. The pair of tubes 92 may extend from the proximal end 42 of the auxiliary seat base 36 along the sides 94 of the auxiliary seat base 36 and engage the pair of sleeves 96 in the attached configuration. The sleeves 96 may have a similar cross-section to the pair of tubes 92 and define a receptacle 98 that is dimensioned to fit the pair of tubes 92 within the pair of sleeves 96. The pair of sleeves 96 may be defined by the intermediate portion 80 of the frame structure 44, or may otherwise be defined in the frame structure 44 for receiving the pair of tubes 92. Similar to the hooks 56, the releasing mechanism 62 may be operably coupled with the pair of sleeves 96 and/or the pair of tubes 92 to control engagement of a detent, or biasing pin, that locks the tubes 92 within the sleeves 96. For example, the tubes 92 may engage the sleeves 96 in a telescopic arrangement 100 having a locking pin 102 that extends between holes 104 defined on each of the tubes 92 and the sleeves 96, such that when the holes 104 are aligned, the locking pin 102 forms a snap-fit connection between the sleeve 96 and the tube 92. The releasing mechanism 62 (e.g., a grip protruding from the locking pin 102 for user manipulation) may retract the locking pin 102 to allow the tubes 92 to be removed from the sleeves 96 via a pulling force applied to the auxiliary seat base 36 to pull the auxiliary seat base 36 from the seating assembly 22. Although illustrated with the bar 58 in FIG. 6, it is generally contemplated that the bar 58 may be omitted in some configurations that employ the sleeves 96 and tubes 92 of the connection interface.

Similar to the arrangements previously described, the selective detachment or deployment of the auxiliary seat 40 or auxiliary seat base 36 may be only allowed when the vehicle 20 is stationary, in a parked gear, deactivated (e.g., an engine of the vehicle 20 not running or the ignition not engaged), etc. Further, electrical or mechanical lockouts may be provided to limit the auxiliary seat 40 from detaching or decoupling from the primary seat 34. For example, a mechanical stop, or cover, maybe provided to cover the sleeves 96 when the primary seat 34 is in the first use position to limit engagement of the tubes 92.

Figure 7:
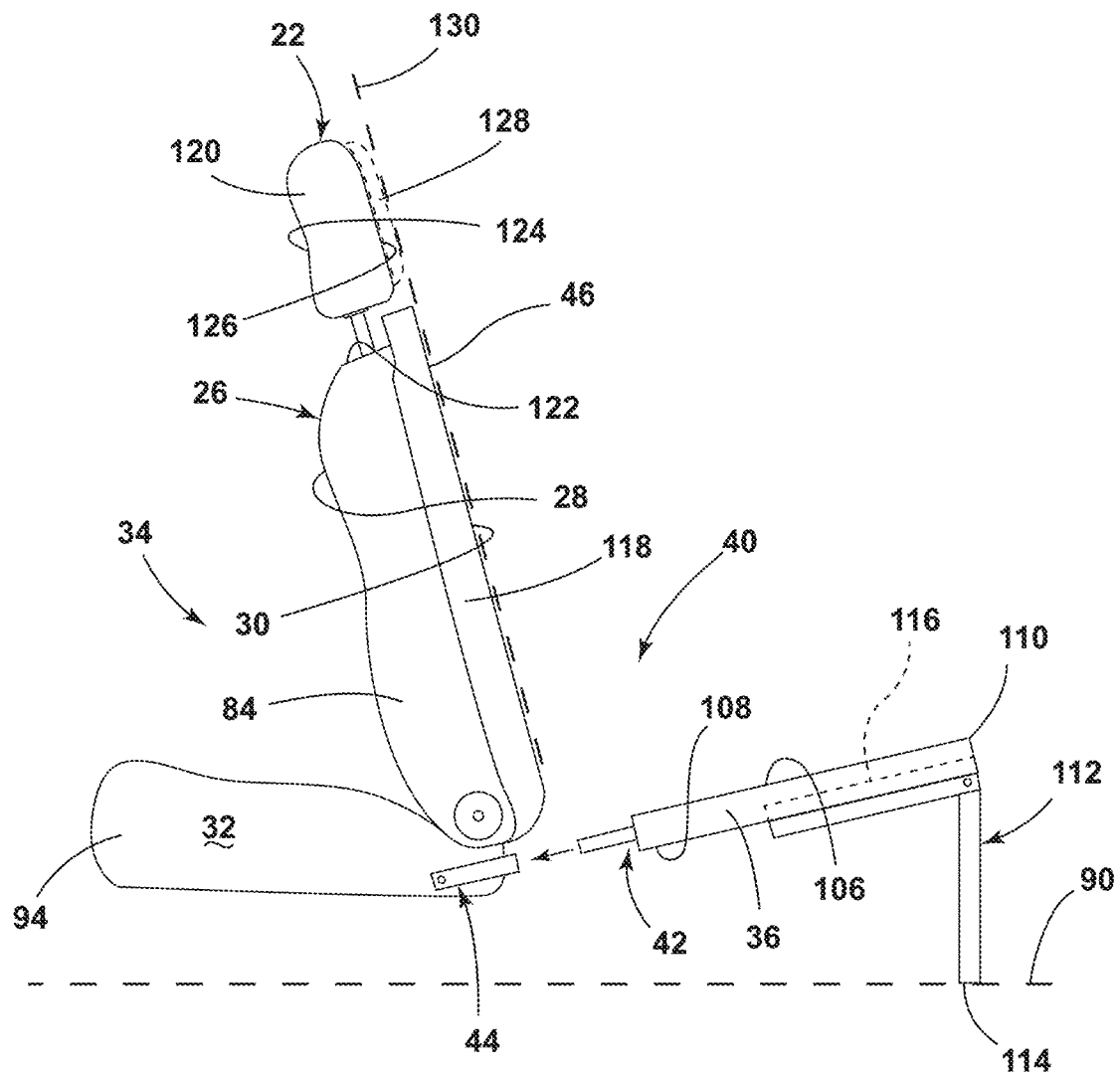
FIG. 7 is a side view of a primary seat equipped with an auxiliary seat, illustrating the auxiliary seat in a deployed position, according to one example.

Referring to FIG. 7, a selectively detachable auxiliary seat base 36 is illustrated aligned with the connection interface. More specifically, the tube 92 is aligned with the sleeve 96 and, upon insertion of the tube 92 with the sleeve 96 via an insertion force (e.g., indicated by arrow), the auxiliary seat base 36 may be connected with the seating assembly 22. The auxiliary seat base 36 may extend between a seating surface 106 and an underside surface 108, spaced from the seating surface 106. The seating surface 106 may be operable to support the lower body portion 21a of the occupant 21 when the auxiliary seat base 36 is in the attached configuration. The seating surface 106 extends between the proximal end 42 that may be adjacent the seat back 46 in the attached configuration and the distal end 110 that may be spaced from the proximal end 42 and generally directed away from the primary seat base 32. A support leg 112 may be attached to the auxiliary seat base 36 at the distal end 110. The support leg 112 is pivotally coupled to the auxiliary seat base 36 and may have a length that corresponds to a distance between the distal end 110 and the floor 90 of the vehicle 20. The support leg 112 may be rotatable between a retracted position and an extended position. In the retracted position, the support leg 112 may be housed in the auxiliary seat base 36 and/or may extend generally parallel to the auxiliary seat base 36 in the retracted position. The support leg 112 may extend generally orthogonal to the auxiliary seat base 36 in the extended position. In the extended position, the support leg 112 may extend away from the auxiliary seat base 36.

When the support leg 112 is in the extended position, a distal end 114 of the support leg 112 may be operable to engage the floor 90 of the vehicle 20 to support the auxiliary seat base 36 and support an occupant 21 in the auxiliary seat 40. Additionally, or alternatively, the support leg 112 may be disposed in a recess 116 that is defined by the auxiliary seat base 36 and extending into the underside surface 108 in the retracted position. The recess 116 may extend toward the seating surface 106. The support leg 112 may be biased in the extended position and/or the retracted position (e.g., away from an intermediate position between the extended position and the retracted position). As illustrated in FIG. 7, the backrest 26 may include an auxiliary cushion 118, or secondary cushion, that is integrated with the backrest 26. For example, the secondary cushion may be formed with the backrest 26, whereas the auxiliary seat base 36 may be removably attached with the seating assembly 22.

In some configurations discussed further herein, the secondary cushion is removable, along with the auxiliary seat back 46, either together with the auxiliary seat base 36 or separate from the auxiliary seat base 36. Stated differently, the auxiliary seat 40 may be removable from the primary seat 34, wholly, partially, and/or in one piece or in two or more pieces. As previously described, the selective detachment or deployment of the auxiliary seat 40 or auxiliary seat base 36 may be only allowed when the vehicle 20 is stationary, in a parked gear, deactivated (e.g., an engine of the vehicle 20 not running or the ignition not engaged), etc. Further, electrical or mechanical lockouts may be provided to limit the auxiliary seat 40 from detaching or decoupling from the primary seat 34.

As illustrated generally throughout the figures, the seating assembly 22, and more particularly the backrest 26, may have a first use position and a second use position. In the first use position, the seating assembly 22 may be operable to support an occupant 21 in the first seat 34, and in the second use position, the seating assembly 22 may be operable to support the occupant 21 in the second use position. The use positions may be related to the degree of recline of the backrest 26, with the backrest 26 leaned forward in the second use position and with the backrest 26 leaned rearward in the first use position. It is generally contemplated that the first use and second use positions may correspond with different directions other than frontward/rearward, and that these terms are used herein in an exemplary manner that is nonlimiting. For example, the primary seat 34 may face any direction that is generally away from the auxiliary seat 40, such as in a vehicle right direction, with the auxiliary seat 40 facing a vehicle left direction in the attached configuration of the auxiliary seat 40. In some particular examples, the first use position is defined by the backrest 26 extending at a recline angle between the backrest 26 and the primary seat base 32, where the recline angle is in the range of approximately 90° to approximately 140°. In this example, the second use position is defined by the recline angle being in the range of approximately 40° to approximately 110°. Thus, the first and second use positions may occur simultaneously according to some aspects of the present disclosure. For example, the backrest 26 may be in an upright position, or a 90° recline angle, or between a 90° recline angle and a 100° recline angle.

Consistent with previously described aspects of the disclosure, the second use position may be only accessible when the vehicle 20 is stationary, in a parked gear, deactivated (e.g., an engine of the vehicle 20 not running or the ignition not engaged), etc. Further, electrical or mechanical lockouts may be provided to limit the seating assembly 22 from entering the second use position. Moreover, seat position sensors may be provided to detect weight applied to the second seat 40 to determine the presence of an occupant in the second seat 40 outside of authorized positions.

As previously described, the cross-sectional area of the backrest 26 may be constant between the first use position and the second use position. The cross-sectional area may correspond to a width of the backrest 26. For example, the cross-sectional plane may extend generally parallel to the width of the backrest 26. In some configurations, any, or each, plane that intersects the first and second surfaces 28, 30 defines an area remaining constant between the first use position and the second use position. In this way, each of the first and second seats 34, 40 may share a common seat back having a constant thickness. In some implementations, the backrest 26 has a thickness extending between each upper body support, such as between the first and second surfaces 28, 30. The thickness may remain constant between the forward and reclined positions of the upper support member 26.

It is also contemplated from the disclosure that a rest 120, or rest member, attached to an upper surface 122 of the backrest 26 may extend between a front surface 124 that corresponds to the first surface 28 of the backrest 26 and a rear surface 126 that corresponds with the second surface 30 of the backrest 26. In this way, the rest 120 may have an elongated shape along a side profile of the seating assembly 22, as illustrated. For example, the rest 120 may have a projecting portion 128 that extends away from the front surface 124 to align the rear surface 126 with the second surface 30 along a common plane 130. A central portion of the rear surface 126 may be substantially aligned with the second surface 30, as illustrated.

Figure 8A:
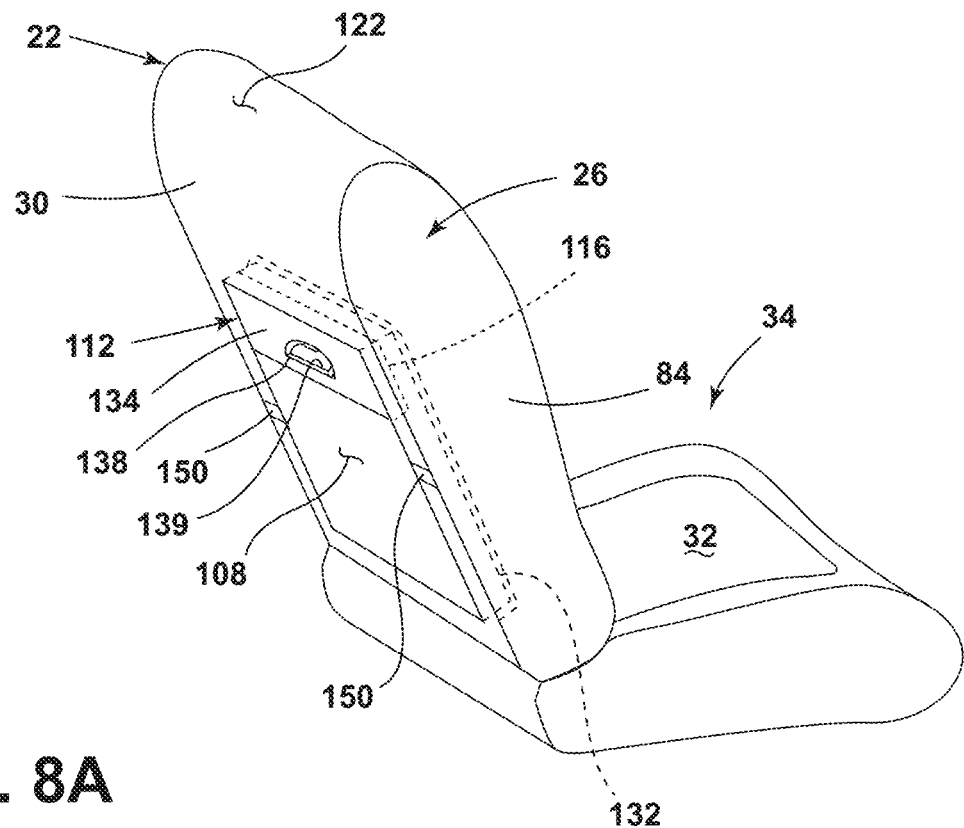
FIG. 8A is a rear perspective view of a primary seat equipped with an auxiliary seat, illustrating the auxiliary seat in a stowed position, according to one example.
Figure 8B:
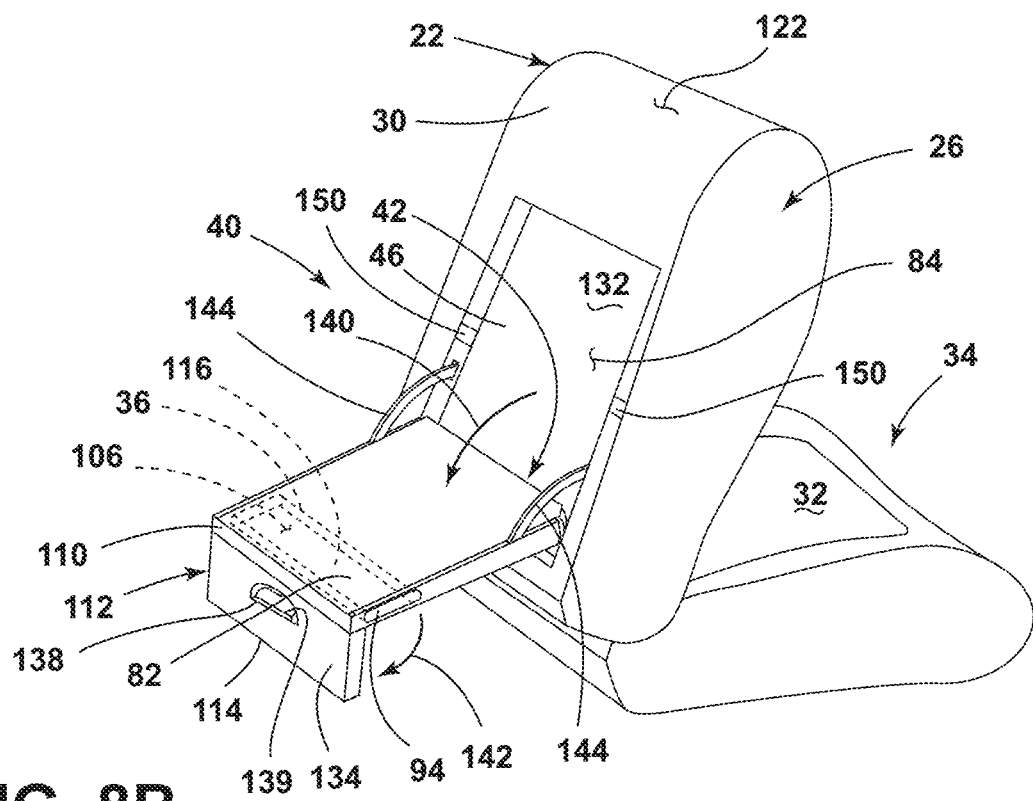
FIG. 8B is a rear perspective view of a primary seat equipped with an auxiliary seat, illustrating the auxiliary seat in a deployed position, according to one example.

Referring now to FIGS. 8A and 8B, a seating assembly 22 constructed in accordance with one aspect of the present disclosure includes a notch 132 defined by the backrest 26 and extending into the second surface 30 for receiving at least a portion of the auxiliary seat 40. The notch 132 extends generally toward the first surface 28 and may house the auxiliary seat base 36 in the stowed position. As shown in the example, the seating surface 106 is disposed within the notch 132 and adjacent the second surface 30 in the stowed position (FIG. 8A). The support leg 112 includes a planar extent 134 that extends between the sides of the auxiliary seat 40 that correspond to the sides 94 of the auxiliary seat base 36. As illustrated, the support leg 112 may span a width of the auxiliary seat 40 measured between the sides 94. In other configurations, the planar extent 134 may be omitted. In some configurations, the support leg 112 may include a pair of legs 136 with one disposed adjacent each side 94. In various configurations, the planar extent 134 may extend between the legs 136. The auxiliary seat base 36 may also include a handle 138 formed on the planar extent 134 that is operable to move the auxiliary seat base 36 between the stowed position and the deployed position. The handle 138 may be disposed within an aperture 139 defined by the planar extent 134 and be pivotable, such that interaction with the handle 138 may rotate the handle 138 to pull the auxiliary seat base 36 away from the notch 132.

A first rotational direction 140 of the auxiliary seat base 36 may be opposite a second rotational direction 142 of the support leg 112 from the stowed position toward the deployed position. For example, as the auxiliary seat 40 is moved between the stowed position and the deployed position, the auxiliary seat base 36 may rotate counterclockwise while the support leg 112 rotates clockwise. Each rotational direction 140, 142 may be influenced by a biasing arrangement that allows the support leg 112 to support the auxiliary seat base 36 by contact with the floor 90 of the vehicle 20. For example, the weight of the auxiliary seat 40 may be distributed to allow the auxiliary seat 40 to be biased away from an intermediate position between the deployed and stowed positions and toward one of the deployed and stowed positions. Additionally, or alternatively, a pair of support arms 144 may extend between the auxiliary seat back 46 and/or backrest 26 and the auxiliary seat base 36 for suspending the auxiliary seat base 36 from the backrest 26. The support arms 144 may include a fabric material, a strap material, and/or another material that may deform along its length. In some examples, the support arms 144 are rigid and may aid in rotational connection between the auxiliary seat 40 and the primary seat 34. In some examples, the support arms 144 may include elastic material. Alternatively, in various examples, the support arms 144 may be rigid and have a pivot point between ends of the support arms 144, as further discussed herein. In the illustrated configuration, the support arms 144 may be stowed within the notch 132 in a relaxed configuration when the auxiliary seat base 36 is in the stowed position. In the deployed position, the pair of support arms 144 may be tautly secured between the auxiliary seat back 46 and the auxiliary seat base 36. The support arms 144 may also serve as armrests for an occupant 21 seated in the auxiliary seat 40.

As previously described, the selective detachment or deployment of the auxiliary seat 40 or auxiliary seat base 36 may be only allowed when the vehicle 20 is stationary, in a parked gear, deactivated (e.g., an engine of the vehicle 20 not running or the ignition not engaged), etc. Further, electrical or mechanical lockouts may be provided to limit the auxiliary seat 40 from detaching or decoupling from the primary seat 34.

Figure 9A:
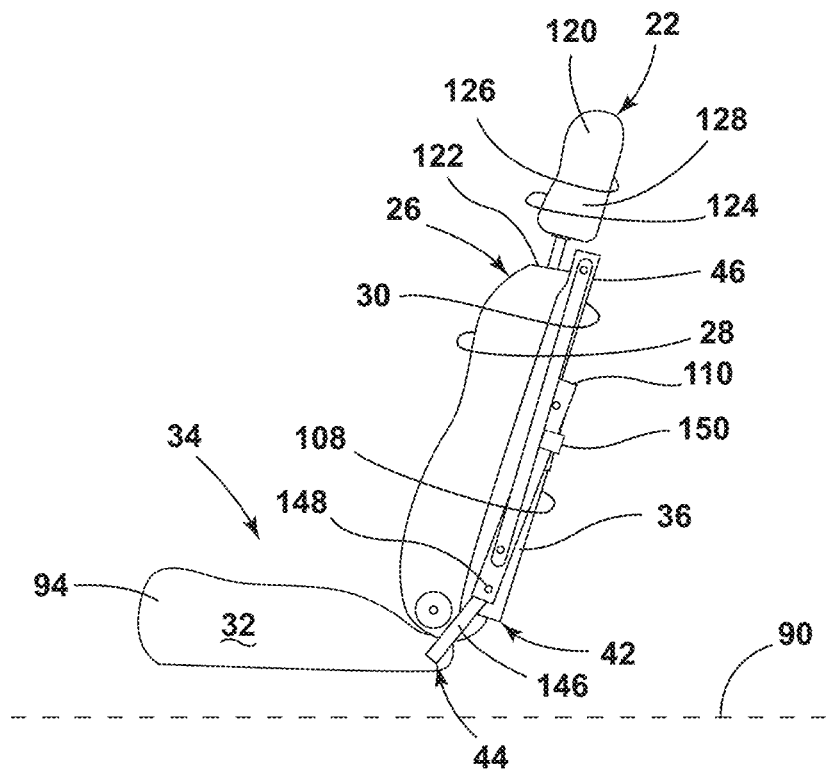
FIG. 9A is a rear perspective view of a primary seat equipped with an auxiliary seat, illustrating the auxiliary seat in a stowed position, according to one example.
Figure 9B:
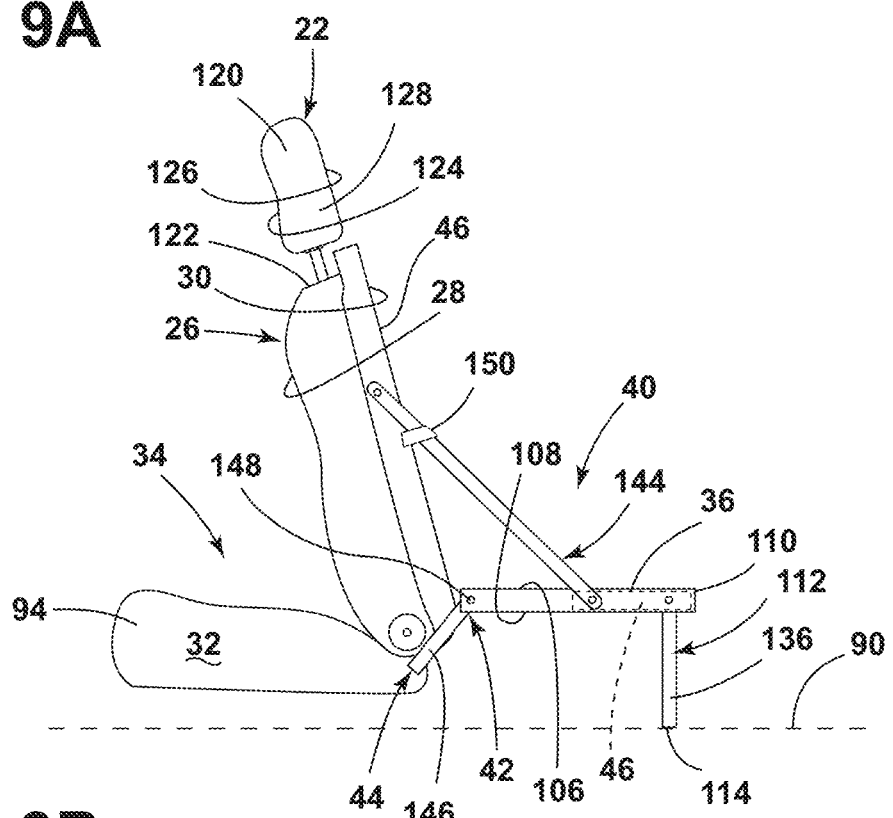
FIG. 9B is a rear perspective view of a primary seat equipped with an auxiliary seat, illustrating the auxiliary seat in a deployed position, according to one example.
Figure 10A:
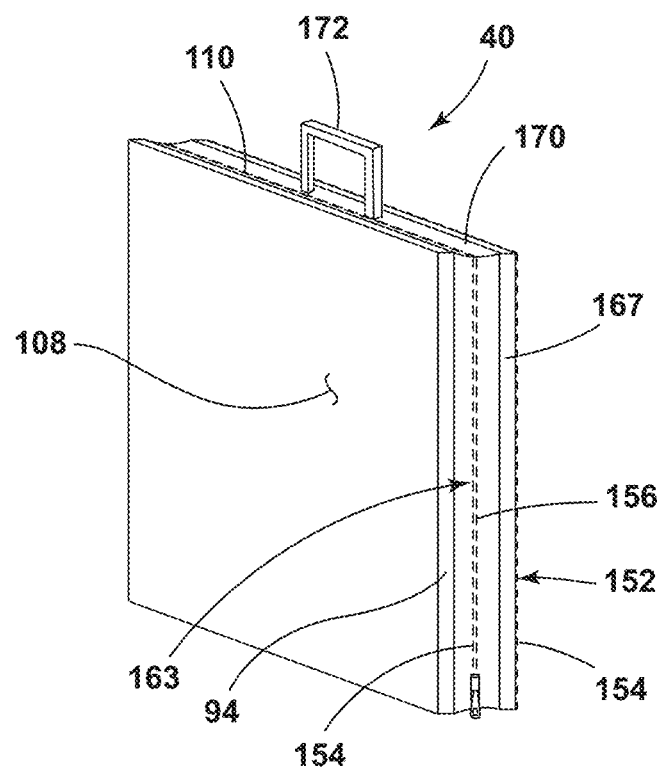
FIG. 10A is a front perspective view of an auxiliary seat in a stowed position, according to one example.
Figure 10B:
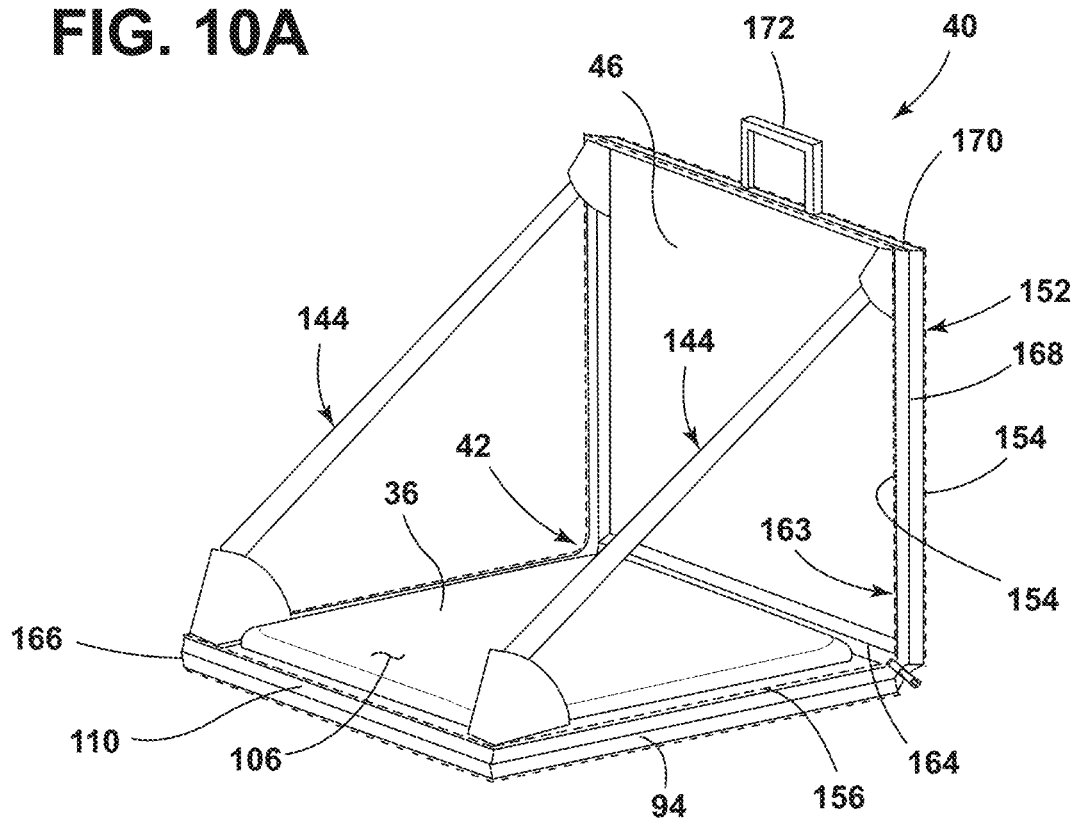
FIG. 10B is a front perspective view of an auxiliary seat in a deployed position, according to one example.

Referring now to FIGS. 9A and 9B, an exemplary configuration of the seating assembly 22 with the notch 132 omitted is generally shown. In a configuration illustrated, the connection interface includes the pair of tubes 92 and the pair of sleeves 96, and further includes a pivotable hinge 148 joining the frame structure 44 of the primary seat 34 with a framework 146 of the auxiliary seat base 36. The pivotable hinge 148 may allow the auxiliary seat base 36 to rotate between the stowed position (e.g., FIG. 9A) and deployed position (e.g., FIG. 9B). The locking member may be disposed between the auxiliary seat base 36 and the auxiliary seat back 46 for selectively securing the auxiliary seat base 36 in the stowed position.

The locking member may include one or more rotatable latches 150 that extend from the backrest 26 and engage the underside surface 108 of the auxiliary seat base 36, as illustrated in FIGS. 8A and 9B. The one or more latches 150 may be disposed along the left and/or right sides 72, 74 to avoid contact with the occupant 21 when the occupant 21 is seated in the auxiliary seat 40. The latches 150 may be selectively adjustable based on the state of the vehicle 20. For example, the latches 150 may have limited adjustment when the vehicle 20 is stationary, in a parked gear, deactivated (e.g., an engine of the vehicle 20 not running or the ignition not engaged), etc. Further, electrical or mechanical lockouts may be provided to hold the latches 150 in a position engaging the auxiliary seat base 36 when the vehicle 20 is not moving.

Referring more particularly to FIGS. 10A-11B, an exemplary locking member may incorporate a zip fastener, or a first zipper 152, that includes a pair of rows of protruding teeth that fasten with one another when a slider of the first zipper 152 is moved along the pair of protruding teeth 154, 156. The locking member may be movable between a locked position and an unlocked position. In the locked position, the locking member secures the auxiliary seat base 36 with the auxiliary seat back 46. In the unlocked position, the auxiliary seat base 36 is movable toward the deployed position to be suspended from the auxiliary seat back 46 and/or the backrest 26. Additionally, or alternatively, the auxiliary seat base 36 may be supported at the distal end 110 from the floor 90 of the vehicle 20 by way of the support leg 112.

The first zipper 152 may extend from the second surface 30 and an outer edge 158 of the seating surface 106, such that one of the pair of protruding teeth 154, 156 is disposed on the auxiliary seat base 36 and the other of the pair of protruding teeth 154, 156 is disposed on the backrest 26. The first zipper 152 may extend along one edge or a plurality of edges of the auxiliary seat base 36 and a corresponding portion of the auxiliary seat back 46. For example, the first zipper 152 may be an inverted U-shape extending between side edges 160 of the auxiliary seat base 36 and along the distal end 110 of the auxiliary seat base 36. It is generally contemplated that the auxiliary seat back 46 may be removable from the backrest 26 as previously described, via the peg and slot arrangement adjacent to an upper part of the backrest 26, as previously illustrated. Thus, according to the aspects illustrated in FIGS. 10A and 10B, both the auxiliary seat base 36 and the auxiliary seat back 46 may be removed together or separately from the primary seat 34. As discussed further herein, the primary seat 34 and/or the auxiliary seat back 46 may be employed in alternative locations of the vehicle 20. Additionally, or alternatively, the primary seat 34 and/or the auxiliary seat back 46 may be employed in positions outside of the vehicle 20.

Figure 11A:
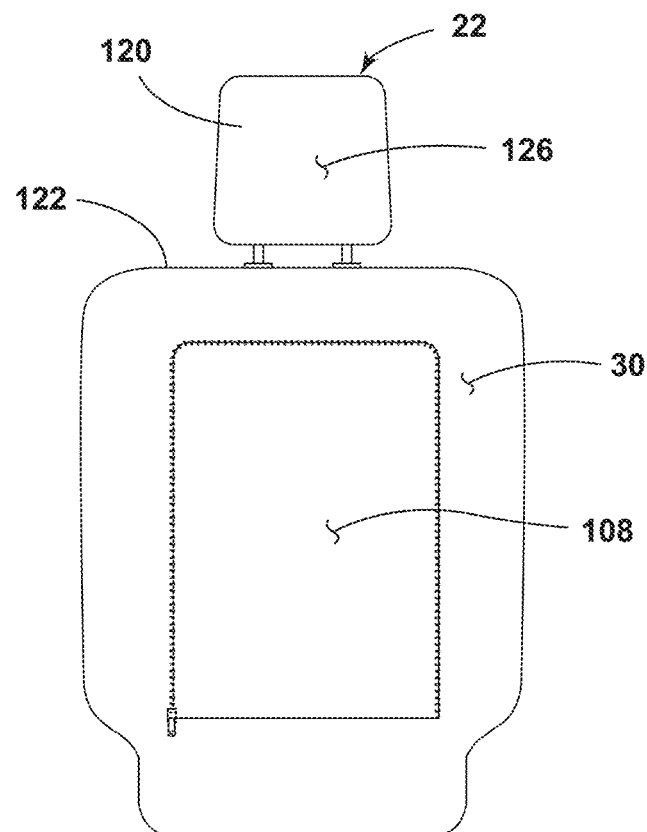
FIG. 11A is a rear elevational view of a primary seat equipped with an auxiliary seat, illustrating the auxiliary seat in a stowed position, according to one example.
Figure 11B:
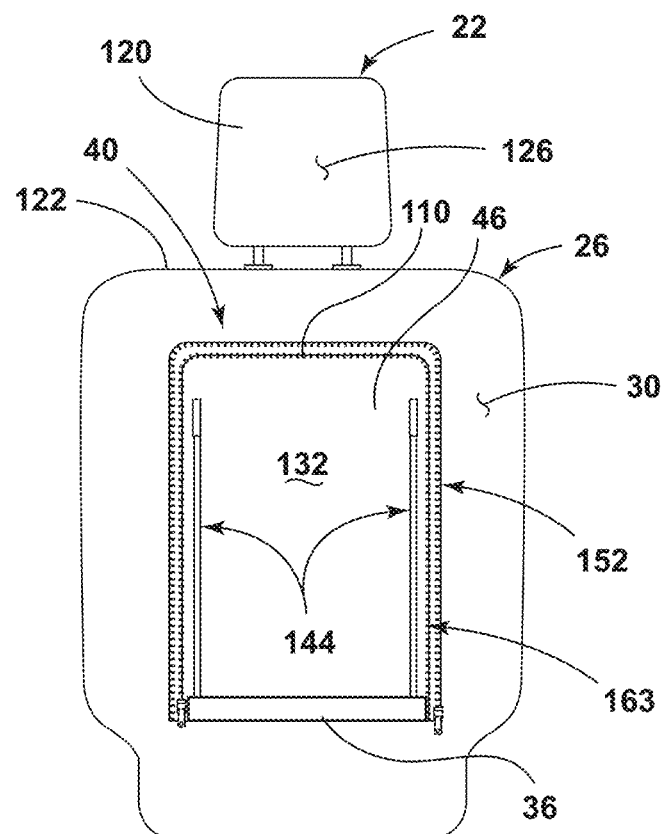
FIG. 11B is a rear elevational view of a primary seat equipped with an auxiliary seat, illustrating the auxiliary seat in a deployed position, according to one example.

Referring to FIGS. 11A-11B, particular aspects of the seating assembly 22 incorporating the locking feature in the form of the first zipper 152 are generally illustrated. In the particular configuration shown, the connection member is also in the form of a zipper (e.g., a second zipper 163). In this way, the auxiliary seat 40 may be pivotable between the deployed and stowed position when attached to the backrest 26, and detachable from the backrest 26, via the second zipper 163. Although generally illustrated having a U-shape as shown in FIGS. 11A and 11B, the first and second zippers 152, 163 may be in the form of any shape that allows both the auxiliary seat 40 to be deployed from the stowed position and the auxiliary seat 40 to be removed in the detached configuration.

According to some aspects, the engaging and receiving members of the connection interface are clasps of the second zipper 163. For example, the clasps may be the pair of rows of interlocking teeth 154, 156. Disengagement of the clasps may define the detached configuration of the auxiliary seat 40 for configurations incorporating the first and/or second zippers 152, 163. In various examples the auxiliary seat base 36 and/or the auxiliary seat back 46 of the auxiliary seat 40 may be provided with trim coverings that are made from weather-resistant textiles. In such examples, the user 21 may transition the auxiliary seat 40 of the seating assembly 22 from the interior (e.g., within the passenger compartment 24) with a decreased probability of weather-related damage occurring to the auxiliary seat base 36 and/or the auxiliary seat back 46.

As shown in the exemplary configuration of FIGS. 10A-11B, the auxiliary seat back 46 and the auxiliary seat base 36 may be integrally formed with one or another along a seam 164 about which the auxiliary seat base 36 pivots. More particularly, the auxiliary seat base 36 may include cushions or another elastic member that allows the auxiliary seat back 46 and the auxiliary seat base 36 to be integral with one another. Thus, a first support structure 166 for the auxiliary seat base 36 may be separate from a second support structure 168 for the auxiliary seat back 46. The cushion can form the second surface 30. The cushion may be selectively removable from the backrest 26 and configured to engage the auxiliary seat base 36 to support the lower body portion 21a of the occupant 21 in the detached configuration.

Adjacent a top edge 170 of the auxiliary seat back 46 may be a gripping member 172, or a handle, protruding upwardly from the top edge 170. The gripping member 172 may be disposed within the notch 132 when the auxiliary seat base 36 is in the attached configuration. The gripping member 172 may allow an occupant 21 to remove the auxiliary seat 40 from the backrest 26 when the second zipper 163 is in the unlocked position. Thus, a locked position of the second zipper 163 may correspond with the auxiliary seat back 46 secured to the backrest 26, and an unlocked position may correspond to the auxiliary seat back 46 being disconnected from the backrest 26. Although not illustrated in FIGS. 10A-11B, it is generally contemplated that in addition to the support arms 144, the auxiliary seat base 36 may include the support leg 112, or pair of legs 136, that may rotate outwardly from the distal end 110 to support the auxiliary seat base 36 in the deployed position. As shown in FIGS. 11A and 11B, the zippers 152, 163 may be arranged in a concentric configuration, with the first zipper 152 disposed radially outwardly from the second zipper 163, such that unzipping the first zipper 152 and deploying the auxiliary seat base 36 reveals the second zipper 163 disposed within the notch 132. In this way, unzipping the first zipper 152 and the second zipper 163 may allow removal of the auxiliary seat 40 from the backrest 26.

As previously described, the selective detachment or deployment of the auxiliary seat 40 or auxiliary seat base 36 may be only allowed when the vehicle 20 is stationary, in a parked gear, deactivated (e.g., an engine of the vehicle 20 not running or the ignition not engaged), etc. Further, electrical or mechanical lockouts may be provided to limit the auxiliary seat 40 from detaching or decoupling from the primary seat 34. For example, the auxiliary seat 40 may be limited from removal or deployment when the vehicle 20 is moving.

Figure 12:
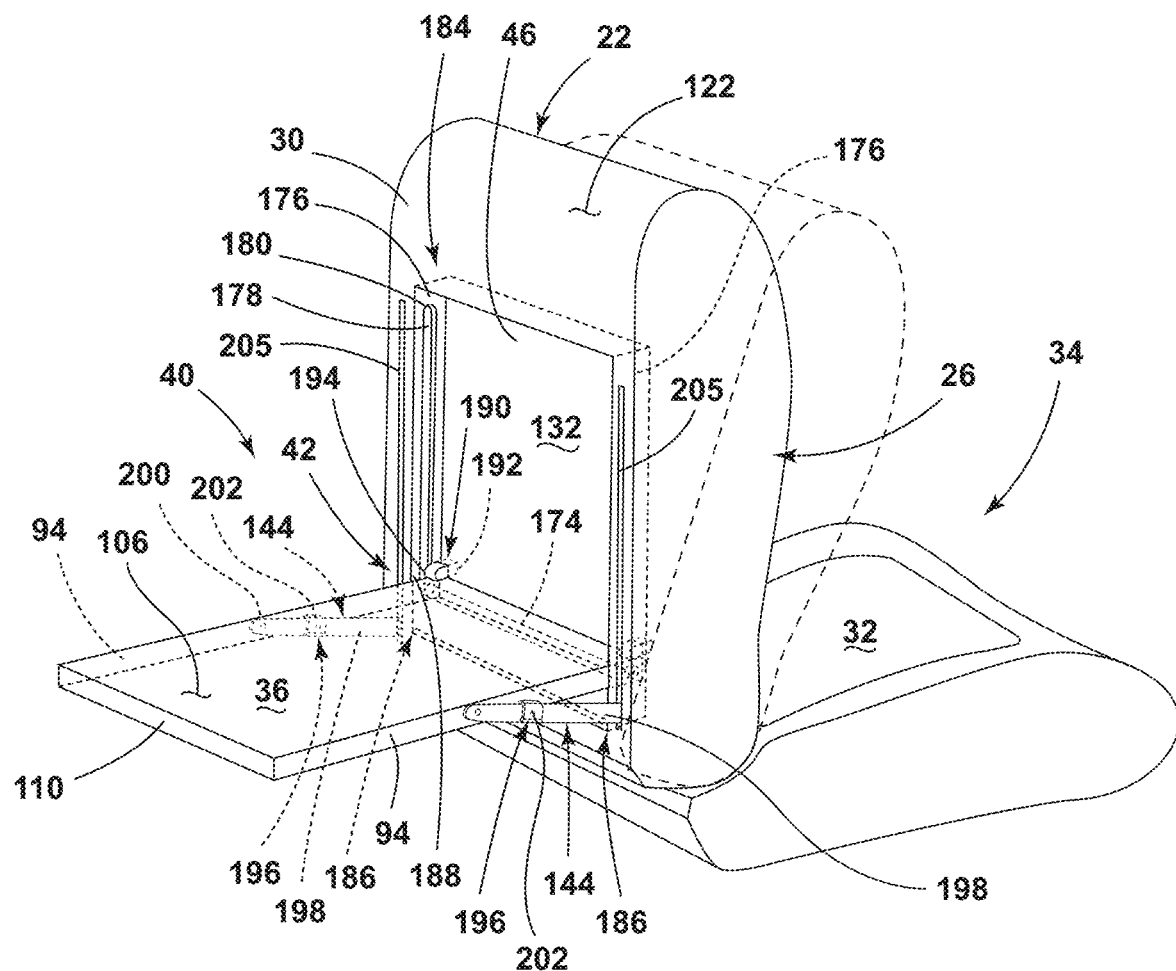
FIG. 12 is a rear perspective view of a primary seat equipped with an auxiliary seat, illustrating the auxiliary seat in a deployed position, according to one example.
Figure 13A:
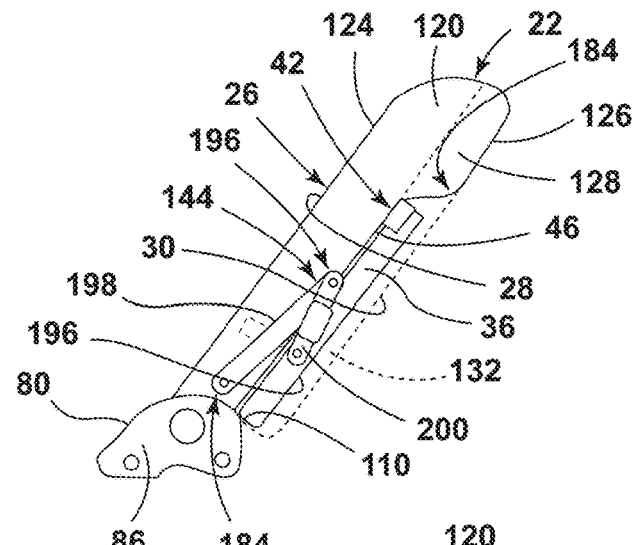
FIG. 13A is a side cross-sectional view taken along a height of a seating assembly equipped with an auxiliary seat, illustrating the auxiliary seat in a stowed position, according to one example.
Figure 13B:
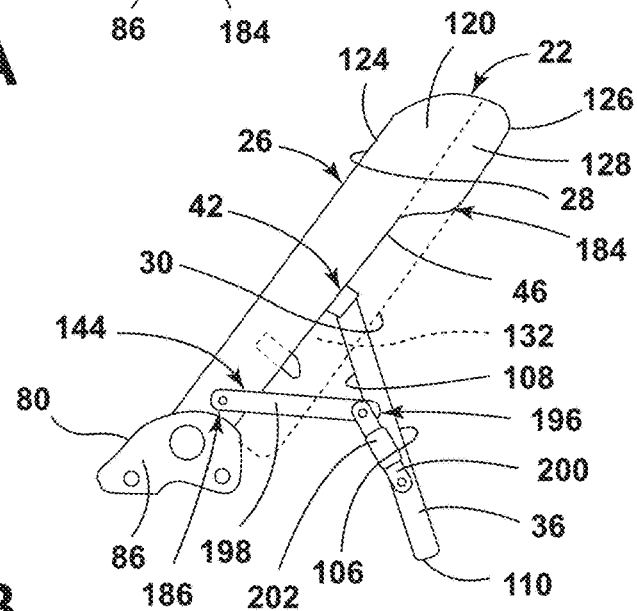
FIG. 13B is a side cross-sectional view taken along a height of a seating assembly equipped with an auxiliary seat, illustrating the auxiliary seat between a stowed position and a deployed position, according to one example.
Figure 13C:
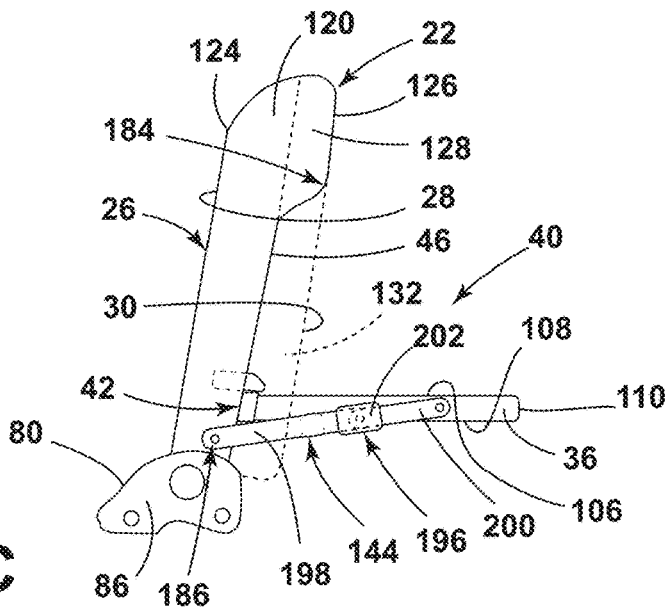
FIG. 13C is a side cross-sectional view taken along a height of a seating assembly equipped with an auxiliary seat, illustrating the auxiliary seat in a deployed position, according to one example.

Referring now to FIGS. 12-13C, one particular example of the auxiliary seat 40 is illustrated. In this example, the auxiliary seat base 36 is stored within the notch 132 of the backrest 26 in the stowed position and is moveably connected with the primary seat 34 via a hinge bar 174. The notch 132 forms a bottom surface and a pair of opposing side surfaces 176 that extend upwardly from the bottom surface toward a top surface (not shown). A slot 178 is disposed on each of the pair of side surfaces 176. The slot 178 may be elongated and extend between a first end 180 and a second end 182. The first end 180 may be positioned toward an upper end 184 of the backrest 26, and the second end 182 may be positioned toward a lower end 186 of the backrest 26. The auxiliary seat base 36 may be supported by a pivot member, such as the hinge bar 174, that extends along the proximal end 42 of the auxiliary seat base 36 and includes protruding portions 188 that engage each slot 178. The arrangement of the pair of slots 178 and the pivot member allows the pivot member to translate along the slot 178 between the first end 180 and the second end 182 to move the auxiliary seat base 36 toward the upper portion 78 or toward the lower portion 76 of the backrest 26, respectively. It is generally contemplated that the notch 132 may be shallower or deeper than as illustrated in FIG. 12 and that the particular dimensions as previously discussed shown are merely exemplary and not intended to be limited to a particular scale. Rather, the notch 132 may be a slight indentation into the backrest 26 that allows for a comfortable support of the upper body portion 21b of the occupant 21 when the occupant 21 is sitting in the auxiliary seat 40.

Between the stowed position and the deployed position, the auxiliary seat base 36 may translate between the first end 180 and the second end 182. The auxiliary seat base 36 may rotate about the proximal end 42 to the deployed position when the proximal end 42 of the auxiliary seat base 36 is disposed adjacent the second end 182 of the slots 178. In this way, the seating surface 106 of the auxiliary seat base 36 may be continuous with, or the same as, the second surface 30 of the backrest 26 when the auxiliary seat base 36 is in the stowed position. As previously described, the auxiliary seat base 36 may include the support leg 112/legs 136 that may pivot about the distal end 110 of the auxiliary seat base 36 in the deployed position to support the auxiliary seat base 36 from the vehicle floor 90 or from another structure supported by the vehicle floor 90.

A stopping member 190 may be disposed adjacent the slot 178 and selectively engage a portion of the auxiliary seat base 36, such as the seating surface 106 (as illustrated) or the pivot member. The stopping member 190 (e.g., stopping feature) secures the auxiliary seat base 36 in the deployed position. The pivot member may alternately be referred to as a sliding member. By engaging a portion of the auxiliary seat base 36, the stopping member 190 may limit movement of the auxiliary seat base 36 toward the first end 180. More particularly, the backrest 26 may define an aperture 192 in which the stopping member 190 is movably disposed.

Although illustrated projecting into the second surface 30 of the backrest 26, the aperture 192 may protrude into the first or second side surfaces 176 formed by the notch 132 or may be positioned in another location of the second surface 30 to interact with a different portion of the auxiliary seat base 36 than the seating surface 106, as previously described. The aperture 192 may form a bracing surface disposed opposite the stopping member 190 for contacting a biasing member disposed between the stopping member 190 and the bracing surface. The biasing member may be a spring or another biasing structure, such as a foam or rubber elastic member that allows the stopping member 190 to be biased toward an outward position. More specifically, the stopping member 190 may be moved between an outward position and an inward position. The biasing member may be operable to allow movement of the pivot member past the stopping member 190 toward a lower position (e.g., the second end 182) and limit movement of the pivot member past the stopping member 190 toward the upper position (e.g., the first end 180).

The outward position is generally illustrated in FIG. 12 with a contacting surface of the lower support member engaging the seating surface 106. The stopping member 190 may also include a tapered surface 194 facing the first end 180 of the slots 178 (e.g., toward an upper position of the pivot member) that may allow the pivot member to move past the stopping member 190 when moving toward the lower portion 76. The contacting surface may not be tapered to allow the seat to remain in the deployed position (e.g., the sliding member to be limited from movement toward the upper portion 78 of the backrest 26). For example, the stopping member 190 may include a stopping surface generally perpendicular to the translative motion of the hinge bar 174 and facing the second end 182. In this way, the tapered surface 194 and the contacting surface of the stopping member 190 may together operate as a biasing member to allow movement of the pivot member past the stopping feature 190 toward the lower position and limit movement of the pivot member past the stopping feature 190 toward the upper position. The stopping member 190 may be retracted or extended by an interface mechanism or may be directly manipulated by an occupant 21 to be moved toward the inner position to allow the auxiliary seat base 36 to move toward the upper end 184.

In operation, the auxiliary seat base 36 is moved from the stowed position to the deployed position by translational motion along the backrest 26 and rotational motion relative to the backrest 26. For example, the pivot member may provide a rotational axis, and may be translated along the slots 178 from the first end 180 toward the second end 182 between the stowed position and the deployed position, respectively. When the hinge bar 174 reaches a position adjacent the second end 182 of the slots 178, the hinge bar 174 engages the tapered surface 194 and pushes the stopping member 190 into the inner position (e.g., into the aperture 192). Once the auxiliary seat base 36 has moved past the stopping member 190, the stopping member 190, via, e.g., the biasing member, moves into the outward position to lock the auxiliary seat base 36 in the deployed position. When moving from the deployed position toward the stowed position, the stopping member 190 is retracted into the inner position via user interaction with the stopping member 190, directly or indirectly. For example, the user 21 may manipulate an electrical switch that energizes or de-energizes a solenoid coil to retract the stopping member 190 into the inner position. In the example shown, the stopping member 190 may be directly pushed into the inner position. Alternatively, the stopping member 190 may be retracted by a mechanical switch or controlled by an interface mechanism that is operably coupled with the stopping member 190 and/or the biasing member to pull the stopping member 190 into the inner position. Once the stopping member 190 is retracted in the inner position, the auxiliary seat base 36 may be lifted or moved toward the first end 180 of the slot 178.

It is contemplated that the auxiliary seat 40 may not be able to slide down the slots 178 (e.g., be deployed) when the vehicle 20 is moving, consistent with previously described aspects. In this way, selective detachment or deployment of the auxiliary seat 40 or auxiliary seat base 36 may be only allowed when the vehicle 20 is stationary, in a parked gear, deactivated (e.g., an engine of the vehicle 20 not running or the ignition not engaged), etc. Further, electrical or mechanical lockouts may be provided to limit the auxiliary seat 40 from detaching or decoupling from the primary seat 34.

Also illustrated in FIGS. 12-13C is one exemplary configuration of the support arm 144. As previously described, the support arm 144 extends between the backrest 26 and the auxiliary seat base 36. The support arm 144 may include a hinge connection 196 that extends into a first member 198 of the support arm 144 and a second member 200 of the support arm 144. The hinge connection 196 may allow the second member 200 to rotate relative to the first member 198 between a folded position that corresponds to the stowed position and an unfolded position that corresponds to the deployed position. The first member 198 may extend between the backrest 26 and the second member 200. The second member 200 may extend between the auxiliary seat base 36 and the second member 200. The hinge connection 196 may move about an axis of rotation that is spaced from the seating assembly 22. As the hinge connection 196 moves, the auxiliary seat base 36 is moved between the stowed position and the deployed position.

The support arm 144 may include a collar 202 that covers the hinge connection 196 and operably locks the hinge connection 196 in the unfolded position of the support arm 144 and the deployed position of the auxiliary seat base 36. The collar 202 may limit movement of the hinge connection 196 along the rotational axis. The collar 202 may be movably disposed on the second member 200 such that, as the support arm 144 moves from the stowed position to the deployed position, the collar 202 may fall or otherwise be biased toward the first member 198. The first member 198 may include a wide portion 204 that limits the collar 202 from sliding down the support arm 144. In this way, the wide portion 204 on the first member 198 may allow the collar 202 to remain over the hinge connection 196 and limit movement of the first member 198 relative to the second member 200 in the deployed position. In operation, the occupant 21 may manually slide the collar 202 along the second member 200 to uncover the hinge connection 196 and allow rotation of the support arm 144 and/or the hinge connection 196 to move the auxiliary seat base 36 toward the stowed position. In this way, manipulation of the collar 202 and the stopping member 190 may be required to move the auxiliary seat base 36 toward the stowed position.

Referring back to FIG. 12, the backrest 26 may define a pair of receptacles 205 that may be narrow and/or elongated between the lower portion 76 of the backrest 26 and the upper portion 78 of the backrest 26 for receiving the support arms 144 in the stowed position. The receptacles 205 may be referred to as slits due to the narrow configuration of the receptacles 205. The slits 205 may allow the support arms 144 to be concealed within the backrest 26 from a side view of the seating assembly 22 when the auxiliary seat base 36 is in the stowed position, as illustrated in FIG. 13A. It is also generally contemplated that the first member 198 may be anchored below the second member 200 relative to the auxiliary seat base 36. Either or both of the collar 202 and the stopping member 190 may provide a force, such as torque, in an opposing direction to a rotational inertia of the auxiliary seat base 36 when the auxiliary seat base 36 is in the deployed position. For example, when a load is applied to the auxiliary seat base 36 unevenly or evenly, the stopping member 190 and/or the collar 202 may apply a torque force in a counterclockwise direction if the rotational inertia of the auxiliary seat base 36 is in a clockwise direction, and vice versa.

In general, the support arm 144 may extend between the backrest 26 and the auxiliary seat base 36 to suspend or support the auxiliary seat base 36 from the backrest 26 in the deployed position in some configurations. As described, the pair of support arms 144 can extend between the auxiliary seat back 46 and the auxiliary seat base 36 along sides of the auxiliary seat 40. The hinge connection 196 may allow the second member 200 to rotate relative to the first member 198 between the folded position corresponding to the stowed position and an unfolded position corresponding to the unfolded position. The collar 202 may cover the hinge connection 196 in the unfolded position.

The motion of the auxiliary seat base 36 in the attached configuration may be described in terms relative to the backrest 26. For example, the auxiliary seat base 36 may engage the second surface 30 in the stowed position and the distal end 110 of the auxiliary seat base 36 may be spaced from the second surface 30 in the deployed position. The second surface 30 may contact the seating surface 106 in the stowed position. The distal end 110 of the auxiliary seat base 36 may be adjacent the back surface in the stowed position and, in the deployed position, the distal end 110 may be spaced from the back surface (e.g., the second surface 30) by a distance greater than a distance from the distal end 110 to the back surface when the auxiliary seat base 36 is in the stowed position. In general, the stowed position corresponds to a non-use position of the auxiliary seat 40 and the deployed position corresponds to a use position of the auxiliary seat 40 (e.g., the second use position).

According to some aspects, the auxiliary seat base 36 is rotatable about the pivot member between the stowed position in which the auxiliary seat base 36 is housed in the backrest 26 and the deployed position in which the auxiliary seat base 36 is folded outwardly from the backrest 26. The pivot member may be translatable along the slot 178 between from an upper position corresponding with the stowed position and a lower position corresponding with the deployed position. The locking member may be moveable from the locked and the unlocked positions to maintain the auxiliary seat base 36 in the stowed position via, for example, the latches 150 or the first zipper 152. The locking member may engage the auxiliary seat base 36 in the locked position to maintain the auxiliary seat base 36 in the stowed position. The locking feature may be disengaged from the auxiliary seat base 36 in the unlocked position to allow the auxiliary seat base 36 to move toward the deployed position.

As previously described, selective detachment or deployment of the auxiliary seat 40 or auxiliary seat base 36 may be only allowed when the vehicle 20 is stationary, in a parked gear, deactivated (e.g., an engine of the vehicle 20 not running or the ignition not engaged), etc. Further, electrical or mechanical lockouts may be provided to limit the auxiliary seat 40 from detaching or decoupling from the primary seat 34. While modern OEMs of passenger vehicles currently warn occupants against sitting in the bed of a pickup truck while the vehicle is moving due to safety concerns, it is anticipated that technology and the regulatory framework may evolve in the future to where such an activity is safe and permissible.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A seating assembly for a vehicle, comprising:
a backrest extending between a first surface and a second surface, the second surface opposing the first surface;

a first seat base operably coupled with the backrest to form a first seat of the seating assembly, the backrest being pivotable relative to the first seat base between a first use position and a second use position;

a second seat base having an attached configuration, wherein in the attached configuration: the second seat base is operably coupled via a connection interface with the backrest, the second seat base and the backrest forming a second seat of the seating assembly in the second use position, and the second seat faces away from the first seat in the second use position;

a frame structure supporting the seating assembly, wherein the frame structure forms at least a part of the connection interface;

at least one hook extending outwardly from a proximal end of the second seat base; and wherein the frame structure includes a bar extending along a width of the seating assembly, the at least one hook engaging the bar to form the connection interface in the attached configuration.

2. The seating assembly of claim 1, wherein the second surface is operable to support an upper body portion of an occupant when the backrest is in the second use position, and wherein the first surface is operable to support the upper body portion of the occupant when the backrest is in the first use position.

3. The seating assembly of claim 2, wherein the first use position is defined by the backrest extending at a recline angle between the backrest and the first seat in the range of approximately 90 degrees to approximately 140 degrees, and wherein the second use position is defined by the recline angle being in the range of approximately 40 degrees and 110 degrees.

4. The seating assembly of claim 1, wherein a cross-sectional plane intersecting each of the first surface and the second surface defines a cross-sectional area of the backrest, the cross-sectional area remaining constant between the first use position and the second use position of the backrest.

5. The seating assembly of claim 4, wherein each plane intersecting the first and second surfaces defines an area remaining constant between the first use position and the second use position.

6. The seating assembly of claim 4, further comprising:
a rest member disposed adjacent a top surface of the backrest and extending between a front surface corresponding with the first surface of the backrest and a rear surface corresponding with the second surface of the backrest.

7. The seating assembly of claim 6, wherein the rear surface is substantially aligned with the second surface.

8. The seating assembly of claim 4, wherein the cross-sectional area corresponds to a width of the backrest.

9. The seating assembly of claim 1, wherein the second seat base has a detached configuration, wherein the second seat base is decoupled from the backrest in the detached configuration.

10. The seating assembly of claim 9, wherein the connection interface includes a receiving member and an engaging member, the frame structure defining the receiving member and the engaging member extending from the second seat base for engaging the receiving member to support the second seat base in the attached configuration.

11. The seating assembly of claim 10, further comprising:
at least one leg extending from a distal end of the second seat base toward a floor of the vehicle in the attached configuration.

12. The seating assembly of claim 1, wherein in the attached configuration, the second seat base is pivotable between a stowed position and a deployed position, and wherein the second seat base engages the second surface in the stowed position, and a distal end of the seat base, opposite the proximal end, is spaced from the second surface in the deployed position.

13. The seating assembly of claim 12, further comprising:
a support arm extending between the backrest and the second seat base for supporting the second seat base in the deployed position.

14. A seating assembly for a vehicle, comprising:
a first seat facing a first direction;
a second seat facing a second direction opposite the first direction;
a backrest common to the first and second seats, the backrest having a first surface corresponding to the first seat and a second surface corresponding to the second seat; and
wherein the second seat comprises:
a seat base pivotally engaging the backrest and rotatable between a stowed position and a deployed position, the seat base including a seating surface supporting a lower body portion of an occupant in the deployed position;
wherein the second surface is operable to support an upper body portion of the occupant in the deployed position and contacts the seating surface in the stowed position, wherein the first surface is fixed relative to the second surface between a rotational movement of the backrest;
a frame structure having an upper portion supporting the backrest, a lower portion supporting a lower body support of the first seat, and an intermediate portion interconnecting the upper portion and the lower portion, wherein the intermediate portion defines a pair of receiving members extending into the frame structure; and
a pair of engaging members extending from the seat base for releasably engaging the pair of receiving members.

15. The seating assembly of claim 14, further comprising:
at least one leg extending between a distal end of the seat base and a floor of the vehicle in the deployed position to support the seat base.

16. The seating assembly of claim 14, further comprising:
a bar extending along a width of the seating assembly; and
at least one hook extending outwardly from a proximal end of the seat base and engaging the bar, wherein the at least one hook is rotatable about the bar between the deployed position and the stowed position.

17. The seating assembly of claim 14, further comprising:
a support arm extending between the backrest and the seat base for supporting the seat base in the deployed position.

18. A vehicle comprising:
a first seat facing a first direction and a second seat facing a second direction, each of the first seat and the second seat comprising:
a lower body support for supporting a lower body portion of an occupant; and
an upper body support for supporting an upper body portion of the occupant;
an upper support member, the upper support member forming the upper body support of the first seat and the second seat and having a thickness extending between each upper body support; and wherein the upper support member is pivotable relative to the lower body support of the first seat between a forward position and a reclined position, the lower body support of the second seat is configured to selectively couple with the upper support member via user manipulation, and the thickness of the upper support member remains constant between the forward position and the reclined position of the upper support member.

19. The seating assembly of claim 1, wherein the lower body support of the second seat is selectively coupled with the upper support member.

20. The vehicle of claim 18, further comprising:
a releasing mechanism configured to attach and detach the lower body support of the second seat with the upper support member.

* * * * *